US012533169B2

(12) United States Patent
Borgmann et al.

(10) Patent No.: US 12,533,169 B2
(45) Date of Patent: Jan. 27, 2026

(54) TRACTION PIN ASSEMBLIES, COMPONENTS, SYSTEMS, AND METHODS

(71) Applicant: Arbutus Medical Inc., Vancouver (CA)

(72) Inventors: Geoff Borgmann, Vancouver (CA);
Lawrence Buchan, Vancouver (CA);
Michael Cancilla, Vancouver (CA);
Radu Postole, Abbotsford (CA); John Kodosky, Helotes, TX (US)

(73) Assignee: Arbutus Medical Inc., Vancouver (CA)

( * ) Notice: Subject to any disclaimer, the term of this patent is extended or adjusted under 35 U.S.C. 154(b) by 324 days.

(21) Appl. No.: 18/019,665

(22) PCT Filed: Sep. 3, 2021

(86) PCT No.: PCT/CA2021/051227
§ 371 (c)(1),
(2) Date: Feb. 3, 2023

(87) PCT Pub. No.: WO2022/047593
PCT Pub. Date: Mar. 10, 2022

(65) Prior Publication Data
US 2024/0008907 A1  Jan. 11, 2024

Related U.S. Application Data

(60) Provisional application No. 63/074,833, filed on Sep. 4, 2020.

(51) Int. Cl.
*A61B 17/84* (2006.01)
(52) U.S. Cl.
CPC .................. *A61B 17/846* (2013.01)
(58) Field of Classification Search
CPC . A61B 17/16; A61B 17/1613; A61B 17/1615; A61B 17/1617; A61B 17/162;
(Continued)

(56) References Cited

U.S. PATENT DOCUMENTS 5,902,306 A * 5/1999 Norman .............. A61B 17/1697
606/104
6,290,701 B1 9/2001 Enayati
(Continued)

FOREIGN PATENT DOCUMENTS

CA 2941501 C * 4/2023 ......... A61B 17/1728
EP 2 526 882 A1 11/2012
(Continued)

OTHER PUBLICATIONS

International Search Report for PCT Appl. No. PCT/CA2021/051228 mailed Nov. 23, 2021.
(Continued)

*Primary Examiner* — Eric S Gibson
(74) *Attorney, Agent, or Firm* — Foley & Lardner LLP

(57) ABSTRACT

Example embodiments provide traction pin assemblies, components, systems, and methods. An example traction pin in assembly comprises a pin insertable into bone tissue to stabilize the bone tissue. The traction pin comprises a shaft extending between an end of the traction pin and a tip of the traction pin. The end of the traction pin is couplable to a driver that is operable to rotate the pin. The assembly may also comprise an adapter that is couplable to the driver to axially retain the traction pin relative to the driver. The assembly may also comprise a guide that defines a passage through which a portion of the shaft of the traction pin extends and provides a surface for gripping the guide. The surface has a larger surface area than a surface of the portion of the shaft extending through the guide.

14 Claims, 30 Drawing Sheets

(58) Field of Classification Search
CPC ............ A61B 17/1622; A61B 17/1624; A61B 17/1626; A61B 17/1628; A61B 17/1633; A61B 17/164; A61B 17/1657; A61B 17/1697; A61B 17/17; A61B 17/1717; A61B 17/1721; A61B 17/1725; A61B 17/1728; A61B 17/1732; A61B 17/1735; A61B 17/846; A61B 17/848
See application file for complete search history.

(56) References Cited

U.S. PATENT DOCUMENTS

| | | | |
|---|---|---|---|
| 9,089,378 B2* | 7/2015 | Riemer | A61B 17/842 |
| 9,736,720 B2 | 8/2017 | Leblanc et al. | |
| 10,405,937 B2* | 9/2019 | Black | A61B 50/30 |
| 10,973,673 B1 | 4/2021 | Skraber | |
| 11,317,928 B2* | 5/2022 | Wozencroft | A61B 17/175 |
| 11,510,718 B2* | 11/2022 | Childers | A61B 17/8861 |
| 2003/0018340 A1 | 1/2003 | Branch | |
| 2008/0154304 A1 | 6/2008 | Crawford et al. | |
| 2012/0325508 A1* | 12/2012 | Nishio | B23B 45/005 173/20 |
| 2014/0046245 A1* | 2/2014 | Cornacchia | A61B 17/1617 604/22 |
| 2014/0276833 A1* | 9/2014 | Larsen | A61B 17/3205 606/170 |
| 2014/0276890 A1* | 9/2014 | Khosla | A61B 17/162 606/103 |
| 2017/0027658 A1* | 2/2017 | Black | A61B 46/10 |
| 2018/0185037 A1 | 7/2018 | Flom et al. | |
| 2018/0256209 A1* | 9/2018 | Muse | A61B 17/1617 |
| 2019/0167280 A1* | 6/2019 | Wozencroft | A61B 17/175 |
| 2019/0216520 A1* | 7/2019 | Babak | A61F 2/461 |
| 2019/0343568 A1* | 11/2019 | Childers | A61B 17/1697 |
| 2024/0008907 A1* | 1/2024 | Borgmann | A61B 17/846 |

FOREIGN PATENT DOCUMENTS

| | | | | |
|---|---|---|---|---|
| GB | 1 571 571 A | | 7/1980 | |
| WO | WO-2007143440 A2 | * | 12/2007 | ......... A61B 17/1624 |
| WO | WO-2010/077309 A2 | | 7/2010 | |
| WO | WO-2015134271 A1 | * | 9/2015 | ......... A61B 17/1728 |
| WO | WO-2018025021 A1 | * | 2/2018 | ......... A61B 17/1668 |
| WO | WO-2019/140482 A1 | | 7/2019 | |
| WO | WO-2020074028 A1 | * | 4/2020 | ........... A61B 17/848 |
| WO | WO-2022047593 A1 | * | 3/2022 | ........... A61B 17/162 |

OTHER PUBLICATIONS

M. Piska et al., "Drilling efficiency and temperature elevation of three types of Kirschner-wire point," The Journal of Bone and Joint Surgery, Jan. 1, 2002, pp. 1-5, vol. 84-B, No. 1, Brno University of Technology, Faculty of Mechanical Engineering, Technicka 2, 616 69 Brno, Czech Republic.

Nutrace YouTube Channel, "Surgical Instrument Laser Etching," Nutrace Instrument Tracking, (Sep. 11, 2014) <https://www.youtube.com/watch?v=e7wCt9K5Mfg>.

Y. Luo et al., "Hollow Notched K-Wires for Bone Drilling With Through-Tool Cooling" Journal of Orthopaedic Research, Nov. 2019, pp. 2297-2306, vol. 37, issn. 11, Wiley Online Library, DOI 10.1002/jor.24419.

Foreign Office Action on CA Application 3, 191,296 dated Oct. 22, 2025.

International Federation of Red Cross and Red Crescent Societies, Standard Products Catalog, "Bow, traction Pins, Boehler, Steinmann" (Dec. 31, 2018) <https:// itemscatalo gue .redcro ss .int/health--3 /surgical-instruments -- 24/ surgicalinstruments--111 /bow-traction-pins-boehl er -steinmann--XSINMEDI7 644 .aspx>.

\* cited by examiner

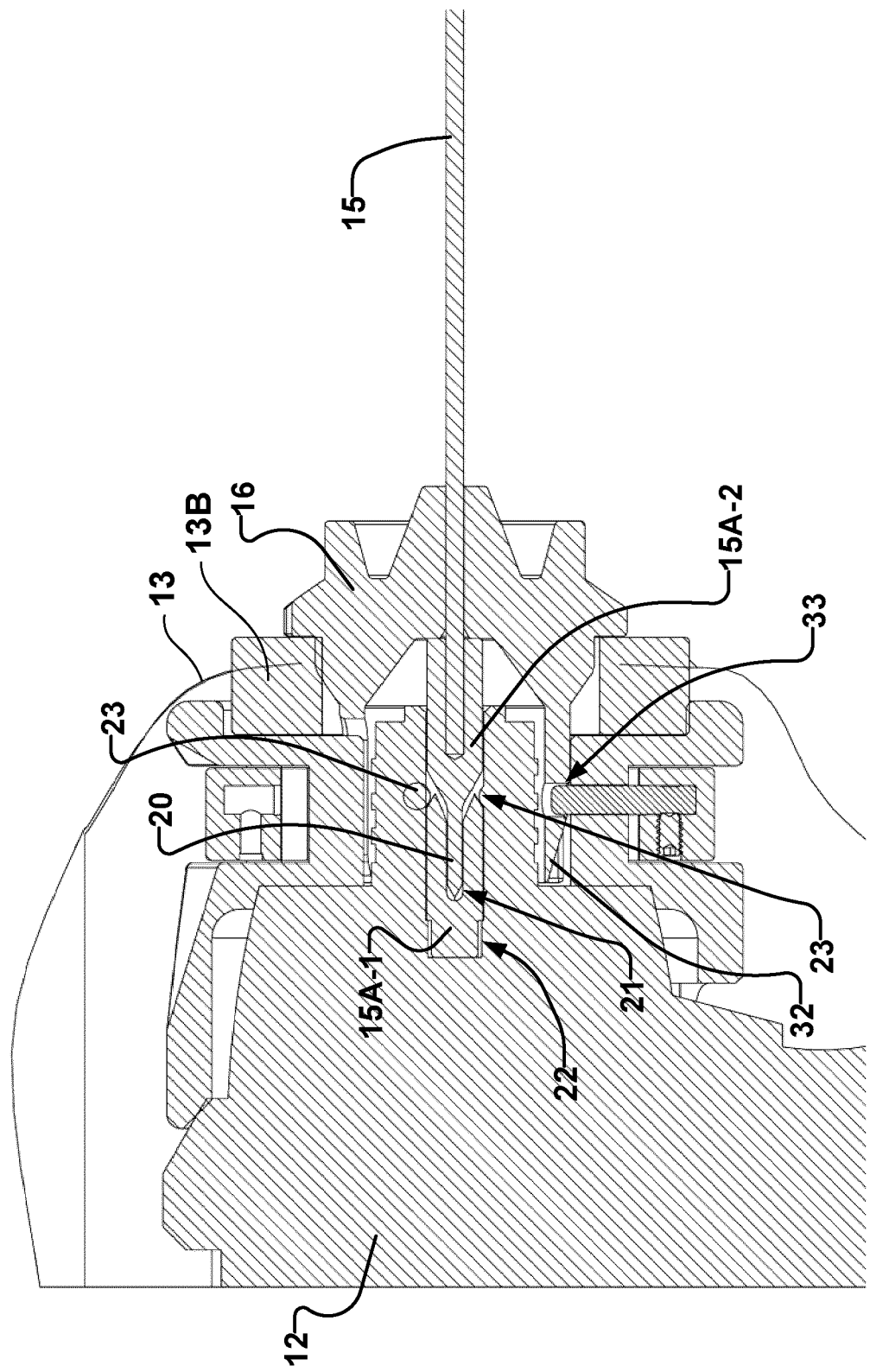

TRACTION PIN ASSEMBLIES, COMPONENTS, SYSTEMS, AND METHODS

CROSS-REFERENCE TO RELATED APPLICATION

The present application claims priority to U.S. Provisional Application No. 63/074,833, filed on Sep. 4, 2020, entitled "TRACTION PIN ASSEMBLIES AND SYSTEMS", the entire contents of which are incorporated herein by reference.

FIELD

The present disclosure relates generally to traction pins which may be inserted into bone. Some embodiments provide traction pin assemblies which may be quickly and easily coupled to a driver, and other embodiments relate components of traction pin assemblies, systems such as kits, and methods.

BACKGROUND

Skeletal traction is an essential part of care for many patients who have sustained traumatic injury. Traction pins are commonly inserted into tissue to rapidly stabilize fractured bones, most typically a fractured femur or hip. Skeletal traction alleviates pain, reduces limb shortening, and lowers chances of further complication. Inserting a traction pin is an invasive procedure that involves puncturing a patient's tissue to provide an anchor to apply skeletal traction. In a severely injured patient, it is critical that a fracture is stabilized efficiently so that a healthcare team can focus on other injuries which could threaten a patient's life. Modern operating rooms provide sterile environments and typically have sterile surgical tools such as a surgical drill, which may be used to insert a suitable traction pin.

It is often not possible to obtain access to such surgical tools or an operating room under short time constraints such as in a hospital emergency room when a patient needs to be rushed for an imaging scan or other procedure, in remote locations, in hospitals with low resources, or in other environments or scenarios. Additionally, current techniques for inserting traction pins can be difficult to perform, especially for a new surgeon or other user who lacks experience with the procedure.

SUMMARY

There is a general desire for traction pin assemblies that can be used quickly and cost effectively. There is also a general desire for a system for inserting a traction pin into tissue that is intuitive to use for users that may be untrained or rushed.

The present disclosure encompasses a number of aspects or embodiments. These include, among others without limitation:
  embodiments related to traction pin assemblies;
  embodiments related to systems and methods for inserting traction pins into tissue;
  embodiments related to traction pin assembly components such as a guide for stabilizing and/or steering traction pins.
These and other embodiments as disclosed herein encompass not only traction pin assemblies and systems, but also components of such assemblies and systems, as well as methods.

One aspect of the present disclosure relates to a traction pin assembly comprising: a traction pin insertable into bone tissue to stabilize the bone tissue, the traction pin comprising a shaft extending between an end of the traction pin and a tip of the traction pin, the end of the traction pin being couplable to a driver that is operable to rotate the traction pin; and an adapter through which a first portion of the shaft of the traction pin extends, the adapter being couplable to the driver to axially retain the traction pin relative to the driver.

A system for inserting a traction pin into tissue, according to another aspect of the present disclosure, comprises a traction pin assembly coupled to a driver.

A method for inserting a traction pin may comprise: using such a system, inserting a traction pin into tissue. Such a method may also involve, while the traction pin is being inserted, stabilizing or steering the traction pin by holding onto a guide of the traction pin assembly.

Another aspect relates to use of a traction pin assembly in traction pin insertion.

A further aspect relates to use of a system in traction pin insertion.

A traction pin kit, according to yet another aspect, comprises: a traction pin that is insertable into bone tissue to stabilize the bone tissue, the traction pin comprising a shaft extending between an end of the traction pin and a tip of the traction pin, the end of the traction pin end couplable to a driver that is operable to rotate the traction pin; an adapter through which a first portion of the shaft of the traction pin is extendable, the adapter being couplable to the driver to axially retain the traction pin relative to the driver; and a guide couplable to the traction pin between the adapter and the tip of the traction pin, the guide defining a passage through which a second portion of the shaft of the traction pin is extendable and comprising a surface to enable gripping of the guide, the surface having a larger surface area than a surface of the second portion of the shaft.

A still further aspect of the present disclosure relates to a traction pin that is insertable into bone tissue to stabilize the bone tissue. The traction pin comprises: a pin end couplable to a driver that is operable to rotate the traction pin; a tip; and a shaft extending between the pin end and the tip of the traction pin. The pin end comprises a first end to be received in a coupling mechanism of the driver to couple the pin end to the driver, and a second end, toward the shaft, to engage an adapter, the adapter being couplable to the driver to engage the second end of the pin end and retain the pin end in the coupling mechanism.

An adapter for a traction pin, according to another aspect, comprises: a structure through which a portion of a shaft of the traction pin is extendable, the structure comprising a surface to engage a pin end of the traction pin; and a guiding protrusion, coupled to the structure, to couple the adapter to the driver and engage the surface with the pin end to retain the pin end in a coupling mechanism of the driver.

A guide for a traction pin is also disclosed, and may comprise: a structure defining a passage, through which a portion of a shaft of the traction pin is extendable and in which the portion of the shaft is rotatable; a surface to enable gripping of the guide, the surface having a larger surface area than a surface of the second portion of the shaft; and a clamp to releasably engage the portion of the shaft of the traction pin with an engagement force that is independent of gripping force applied to the surface.

Another aspect relates to a cap. The cap is for a traction pin that is insertable into bone tissue to stabilize the bone tissue, and may comprise: a cap body defining a cavity to receive a tip of the traction pin; and a cap end to limit insertion of the traction pin into the cavity. Either or both of the cap body and the cap end may define an air channel to enable fluid communication between the cavity and an exterior of the cap during insertion of the traction pin into the cavity or removal of the traction pin from the cavity.

Further aspects and example embodiments are illustrated in the accompanying drawings and/or described in the following description.

It is emphasized that embodiments may include any of various features disclosed herein, individually or in any combinations, even if such features are recited in different embodiments or claims.

BRIEF DESCRIPTION OF THE DRAWINGS

The accompanying drawings illustrate non-limiting example embodiments of the invention.

FIG. 3H is a schematic cross-sectional view of a coupling of the traction pin of FIG. 3B with a driver according to an example embodiment of the invention.

DETAILED DESCRIPTION

Throughout the following description, specific details are set forth and provided by way of example in order to provide a more thorough understanding of illustrative embodiments of the invention. However, embodiments of the invention may be practiced without these particulars. In other instances, well known elements have not been shown or described in detail to avoid unnecessarily obscuring embodiments of the invention. Accordingly, the specification and drawings are to be regarded in an illustrative sense, rather than a restrictive sense.

Figure 1:
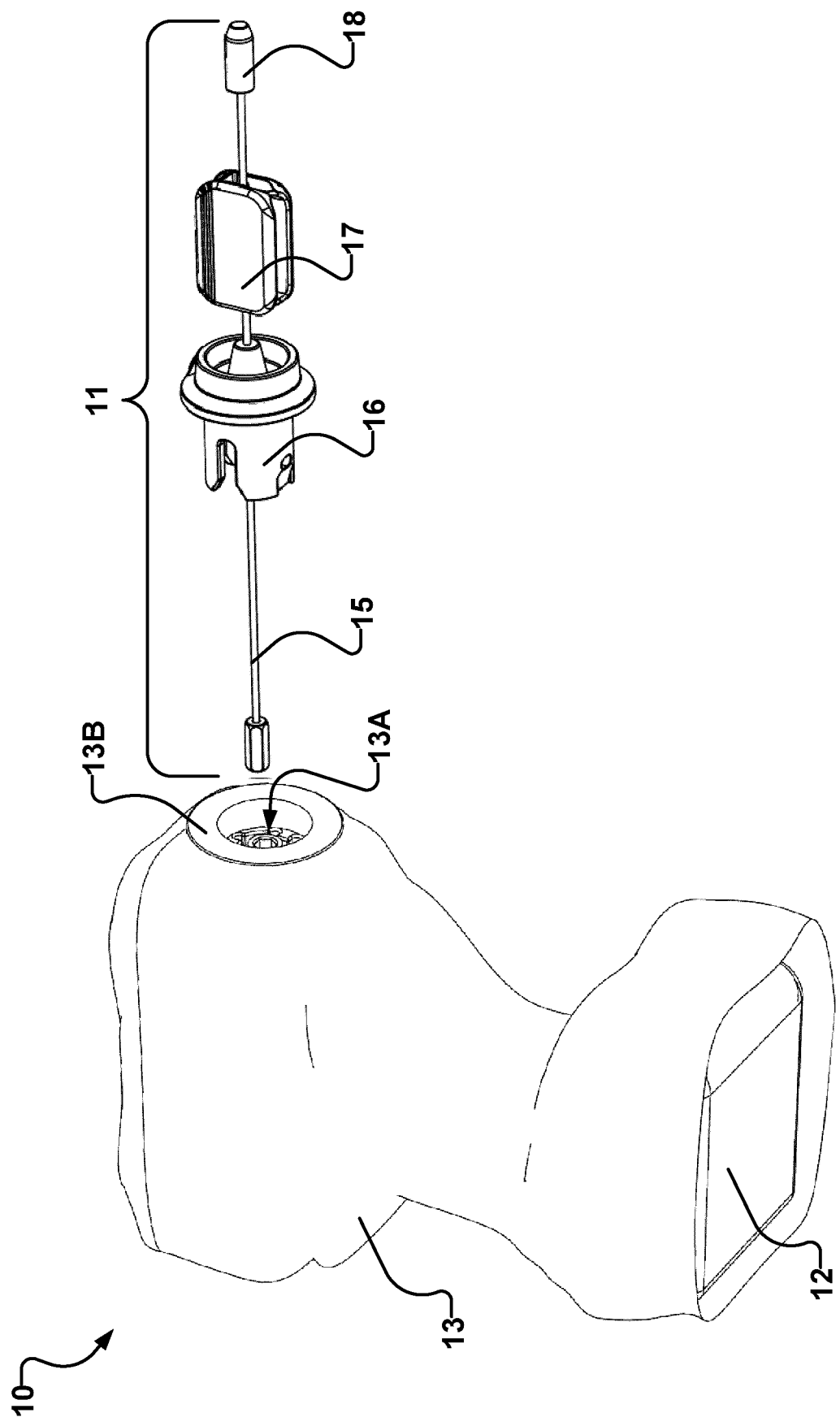
FIG. 1 is a schematic perspective view of a system for inserting a traction pin into tissue according to an example embodiment of the invention.

FIG. 1 schematically illustrates an example system 10 which may be used to insert a traction pin into a patient's bone tissue to stabilize the bone. Preferably system 10 can be deployed rapidly in various medical or non-medical settings, such as in a trauma facility, in an emergency room, in a patient treatment room, in a veterinary office, in a battle field, in a remote environment, in the field during a search-and-rescue mission, and so on, is easy to use, and is not expensive. Various features disclosed herein may provide or contribute to attaining these targets or objectives.

System 10 comprises a traction pin assembly 11 which is removably couplable to a driver 12. Driver 12 provides enough torque to be able to insert a traction pin into a desired tissue region of a human or veterinary patient.

Driver 12 may be a power tool designed for medical purposes, such as a surgical drill. However, driver 12 need not be a medical grade power tool. Driver 12 may, for example, be a commercially available power tool marketed for general purposes, such as carpentry, metalwork, and so on. One example of such a power tool is a power drill or impact driver manufactured by DeWALT™, Makita™ and/or the like. To provide a sterile barrier between driver 12 and a patient, driver 12 may be inserted into a sterile cover 13. Sterile cover 13 comprises a sterile outer surface and provides a barrier between non-sterile driver 12 inside sterile cover 13 and the sterile outer surface of sterile cover 13. The barrier may be provided by a sterile cover that surrounds an entirety of driver 12, or substantially surrounds driver 12 apart from an access opening through which a traction pin or traction pin assembly can be engaged with the driver for example.

Sterile cover 13 may be a single-use disposable cover or a multi-use cover that may be repeatedly sterilized and re-used. In some embodiments, sterile cover 13 in part defines or comprises an opening 13A through which traction pin assembly 11 may be coupled to driver 12. In some embodiments, sterile cover 13 is a sterile cover as described in U.S. Patent Application No. 62/909,441 entitled DISPOSABLE STERILE COVER SYSTEM FOR POWER TOOLS, International PCT Publication No. WO/2021/062548 entitled DISPOSABLE STERILE COVER SYSTEM, COMPONENTS, AND METHODS FOR POWER TOOLS, and/or International PCT Publication No. WO2015/154188 entitled DRILL COVER AND CHUCK MECHANISM, which are hereby incorporated by reference for all purposes.

Figure 2:
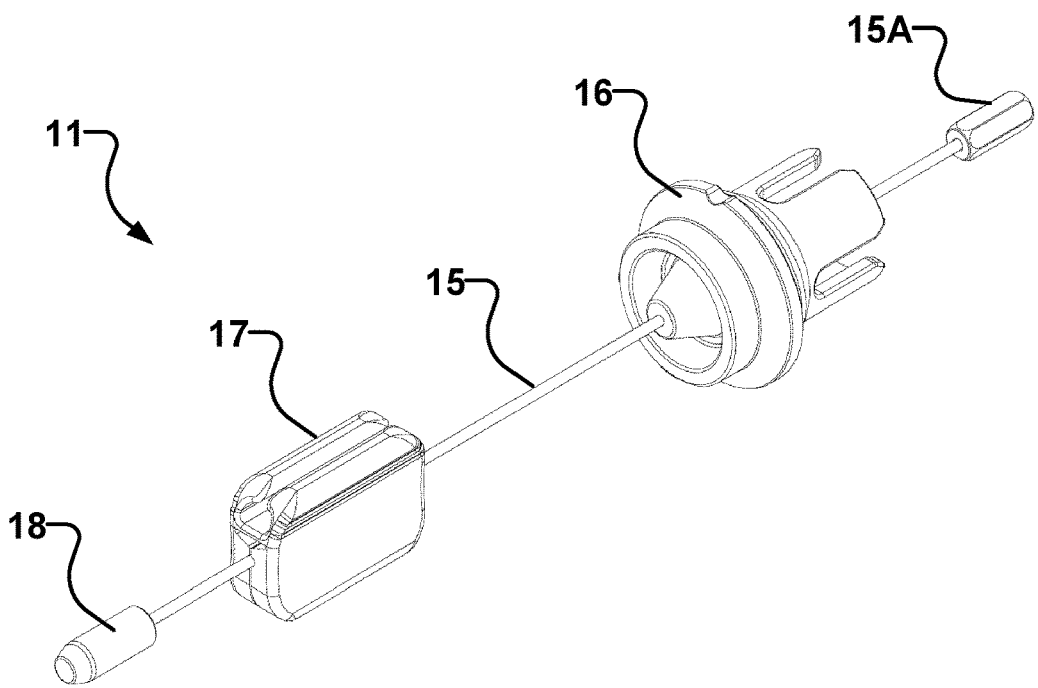
FIG. 2 is a perspective view of a traction pin assembly according to an example embodiment of the invention.

FIG. 2 is an enlarged perspective view of example traction pin assembly 11. Traction pin assembly 11 comprises a traction pin 15, an adapter 16, a guide 17 and a cap 18 (optional). Adapter 16 may be coupled to a corresponding receiving end of driver 12 to axially retain traction pin 15 relative to driver 12. Coupling adapter 16 to the receiving end of driver 12 may also seal the opening of sterile cover 13 through which traction pin assembly 11 passes. Such an opening is shown by way of example at 13A in FIG. 1. Guide 17 provides one or more surfaces which may be held by an operator of system 10 during insertion of traction pin 15 into a patient's tissue to stabilize and/or steer traction pin 15.

Optional cap 18 covers a sharp tip of pin 15 to prevent inadvertent puncturing of tissue or other injury or damage prior to pin 15 being inserted into a patient's tissue.

Components of traction pin assembly 11 are preferably sterile.

Components of traction pin assembly 11 may be single-use disposable components, and may be discarded after use on one patient. A new single-use traction pin assembly may be removed from sterile packaging for each patient that is to be treated, for example. Components of traction pin assembly 11 may instead be multi-use components, and may be sterilized between uses on different patients. Thus, any one or more of a traction pin, an adapter, a guide, a cap, and/or any other component may be sterilizable. Other embodiments are also possible, including embodiments in which, one or more components are single-use components and one or more other components are multi-use components. For example, although a traction pin 15 generally would not be used on more than one patient, at least adapter 16 and/or guide 17 could potentially be re-used.

In some embodiments, traction pin assembly 11 is packaged in a pre-assembled state, for example with adapter 16, guide 17 and cap 18 (if included) coupled to traction pin 15. In some embodiments, traction pin assembly 11 is packed within a sterile packaging, such as two-part peel away packaging that is sterile at least inside.

Adapter 16, guide 17 and/or cap 18 of traction pin assembly 11 may, for example, be made of a suitable plastic. In some embodiments, such components of traction pin assembly 11 are manufactured using a method of injection molding, 3D printing and/or the like. Traction pin 15 may be made of a material appropriate for surgical use, such as stainless steel, titanium and/or the like.

Each of the individual components of traction pin assembly 11 will now be described in more detail by way of example.

The Traction Pin

Figure 3A:
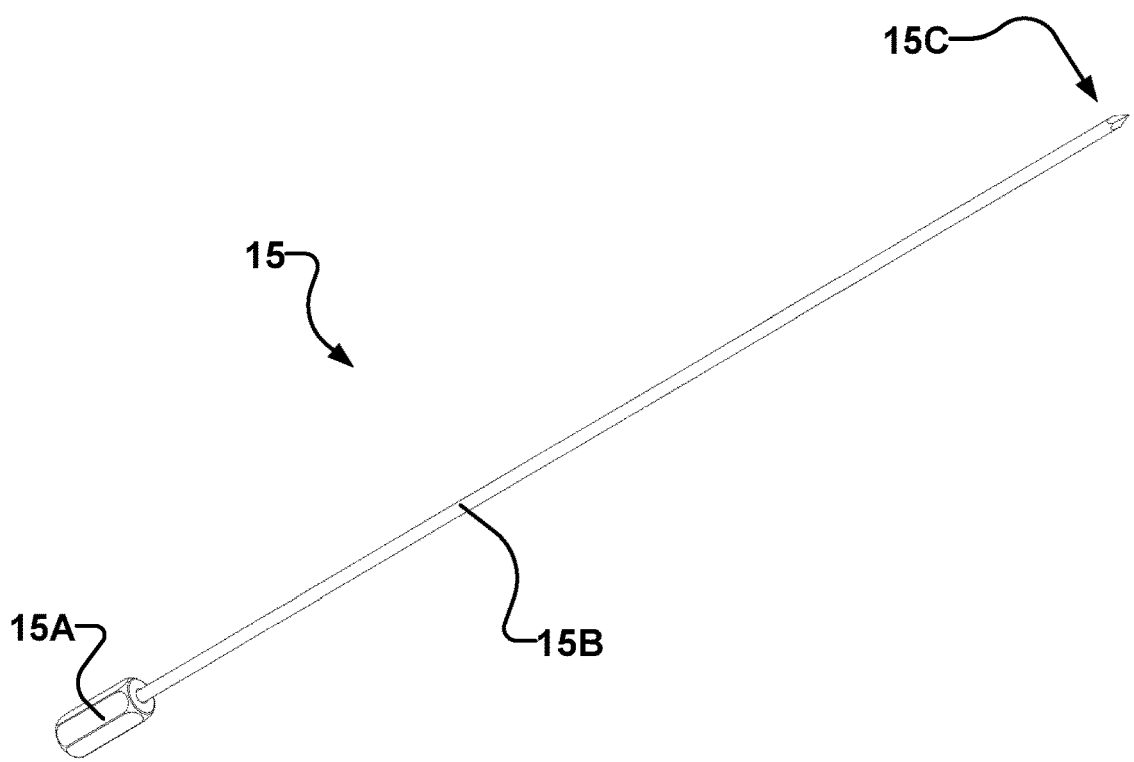
FIG. 3A is a perspective view of a traction pin according to an example embodiment of the invention.

FIG. 3A is a perspective view of an example traction pin 15. Traction pin 15 includes a shaft 15B, a drive end, also referred to herein as a pin end 15B at one end of the shaft 15B, and a tip 15C at an end of the shaft opposite the pin end 15B.

Shaft 15B extends longitudinally from end 15A of traction pin 15 to a tip Tip 15C comprises a sharp tip. Shaft 15B and tip 15C may be like any commercial traction pin that is currently available or available in the future.

In some embodiments, shaft 15B has a diameter that is in a range of about 1 mm and 7 mm. In some embodiments, tip 15C comprises a trocar point. In some embodiments, tip 15C comprises a diamond point.

A length of traction pin 15 may vary based on an intended use for traction pin 15. For example, a traction pin 15 that is intended to be inserted into a patient's arm may be shorter than a traction pin 15 that is intended to be inserted into a patient's leg. In some embodiments, traction pin 15 is a general application pin that can be inserted into any tissue of a patient and is not limb specific or otherwise specific to an intended insertion point or location.

Pin end 15A is designed or otherwise configured to be received within a corresponding coupling mechanism, such as a hex assembly, a drill chuck, and so on, of a receiving end of a driver such as driver 12 (FIG. 1). As used herein, "corresponding" is not intended to indicate or imply fully matching or corresponding features, such as shapes of pin end 15A and a coupling mechanism of a driver.

For example, a coupling mechanism need not fully engage or contact all outer surfaces of pin end 15A. Partial engagement may be sufficient to enable a driver to apply torque to a pin end and rotate a traction pin. Consider the foregoing example of a hex assembly as a coupling mechanism. Although a hex assembly may fully engage or nearly fully engage a hexagonally shaped pin end 15A, vertices of a hex assembly may engage at least vertices of a pin end that has other shapes, such as a pentagon, star, square, rectangle, or triangle. As another example, inner surfaces of a hex assembly need not be flat and may still partially engage outer surfaces of a pin end sufficiently to apply torque to the pin end or allow pin end vertices to engage vertices of the hex assembly. A coupling mechanism may have convex surfaces to partially engage flat surfaces of a pin end for example.

Similarly, the above example of a drill chuck may have multiple movable jaws that are not in any way restricted to engaging an element such as a traction pin end having a shape and/or number of outer surfaces that exactly matches the number of jaws. In one embodiment, a coupling mechanism includes twelve vertices to engage six vertices of a hexagonal pin end, so that the pin end can be engaged with the coupling mechanism in any of various orientations.

References to "corresponding" features or elements, including a coupling mechanism and/or a pin end, as well as other features or elements herein are to be interpreted accordingly. Corresponding features or elements may, but need not necessarily, fully and exactly match each other. The term "corresponding" encompasses embodiments other than those with complete and exact correspondence between corresponding features or elements. This applies not only to a coupling mechanism and/or a pin end, but to other disclosed features or elements as well. Such features or elements are referred to primarily as corresponding, but may also or instead be referred to or considered as associated, compatible, or counterpart features or elements, and/or as being couplable to and/or operable with each other, for example.

Pin end 15A may be formed, installed, or otherwise provided in any of various ways. In an embodiment, pin end 15A is or includes a drive element. The drive element may be made of a plastic material and be over-molded on an end of a traction pin opposite a pin tip 15C, for example. The end of the traction pin opposite the pin tip 15C may be prepared for installation of pin end 15A by one or more processes such as flattening, roughening, scoring, and knurling or otherwise patterning, for example, to form one or more retention surfaces or retention structures to which the drive element may be coupled. A retention surface or retention structure may improve retention of pin end 15A on the shaft 15B and/or improve resistance of the pin end 15A against spinning relative to the shaft 15B when the traction pin 15 is being inserted into tissue using a driver.

Pin end 15A may be provided in other ways, including being fabricated as a separate part and attached by adhesive, one or fasteners, or otherwise to an end of shaft 15B.

Another possible option is to shape or otherwise deform an end of shaft 15B to form a drive structure directly on or in an end of shaft 15B. These examples illustrate that a drive end or drive structure of a traction pin may, but need not necessarily, be a separate component.

In some embodiments, such as in the case of an adjustable coupling mechanism such as a drill chuck, an end of a traction pin shaft may be suitable for use as a drive end without any modification.

Torque generated by a driver such as driver 12 (FIG. 1) is transferred to pin 15 via pin end 15A. A cross-section of pin end 15A may correspond to a cross-section of the coupling mechanism of the receiving end of a driver such as driver 12 (FIG. 1). For example, pin end 15A may comprise a hexagonal cross-section as shown in FIG. 3A. The hexagonal cross-section, for example, corresponds to a hex-coupling mechanism in the receiving end of driver 12. Pin end 15A may have a larger diameter or width than the rest of pin 15. In some embodiments, pin end 15A is circular. In some embodiments, pin end 15A has the same diameter as the rest of pin 15.

In some embodiments, sterile cover 13 (FIG. 1) does not comprise an opening through which pin end 15A may pass for pin 15 to be coupled to driver 12. In such embodiments, pin end 15A may puncture sterile cover 13. For example, pin end 15A may be sharp so that sterile cover 13 can easily be punctured. Sterile cover 13 may seal around pin 15 to close the puncture once pin end 15A has passed through the puncture.

In some embodiments, a portion of sterile cover 13 through which pin end 15A is intended to pass may be weaker than remaining portions of sterile cover 13. For example, sterile cover 13 may be thinner, made of a weaker material, and so on, in areas where sterile cover 13 is intended to be punctured. In some embodiments, sterile cover 13 has a marking or markings indicating exactly where sterile cover 13 is intended to be punctured.

Pin end 15A is shown by way of example as a single component, which as described at least above may be coupled to, or part of, shaft 15B.

Figure 3B:
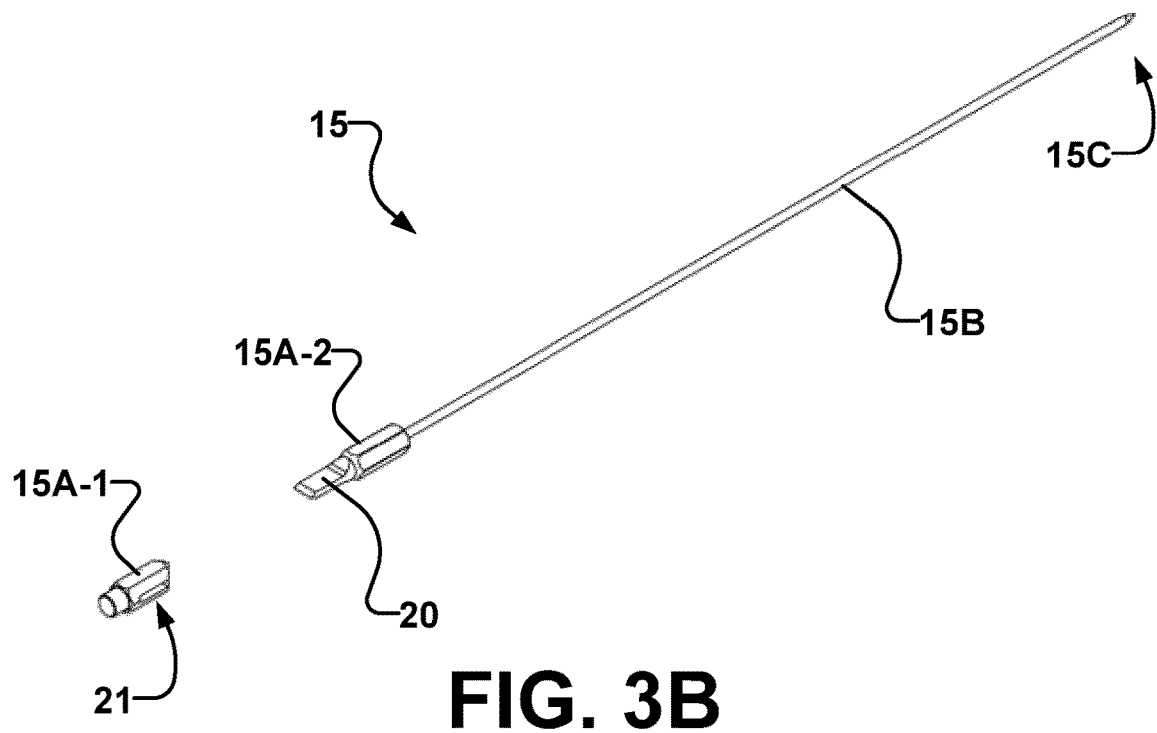
FIG. 3B is an exploded perspective view of a traction pin according to an example embodiment of the invention.
Figure 3C:
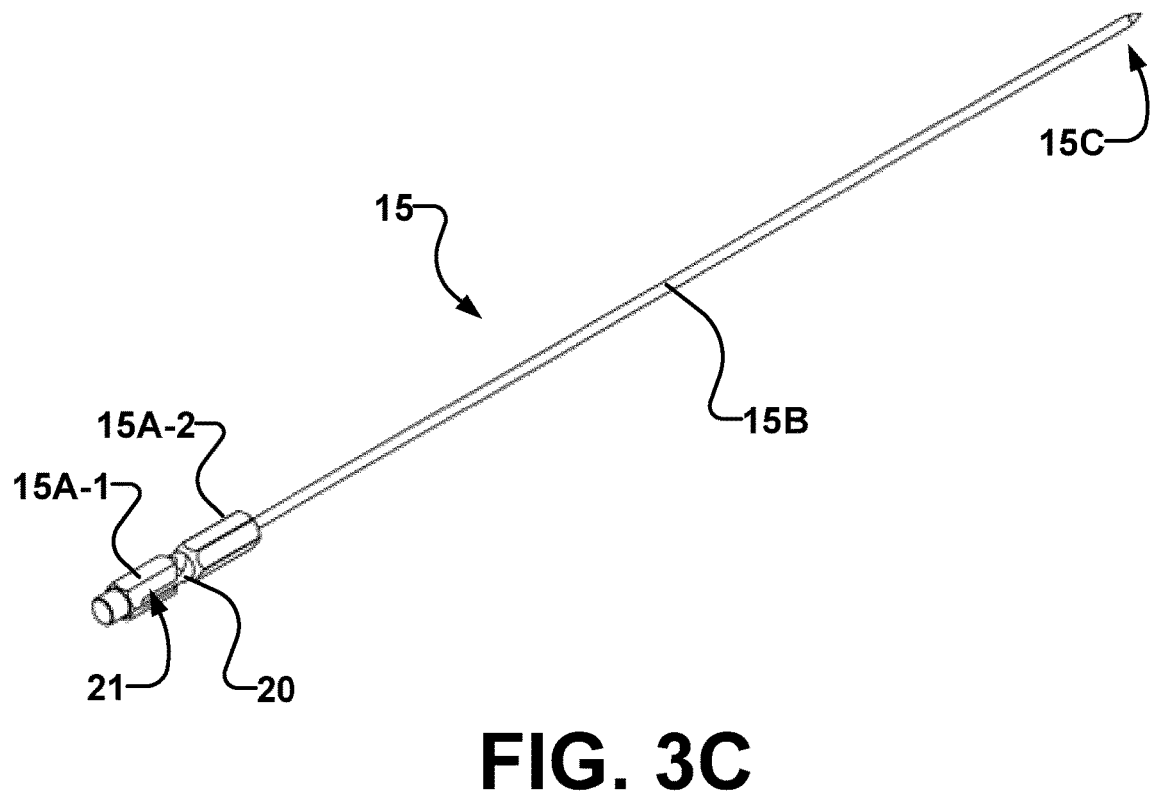
FIG. 3C is a perspective view of the traction pin of FIG. 3B.

In other embodiments, pin end 15A comprises plural members as shown by way of example in FIGS. 3B and 3C. In the example shown, pin end 15A comprises a first part 15A-1, which may be pre-inserted into a coupling mechanism of a receiving end of a driver such as driver 12 (FIG. 1), and a second part 15A-2 coupled to the rest of traction pin 15. Pre-inserted first part 15A-1 may be secured within the coupling mechanism with one or more locking features of the coupling mechanism. For example, one or more locking balls of a drill collar of driver 12 may axially secure first part 15A-1 within the coupling mechanism of driver 12 (see FIG. 3H, for example). First part 15A-1 may be permanently inserted into the coupling mechanism of driver 12. When coupling traction pin 15 to driver 12, second part 15A-2 may be quickly and easily coupled to first part 15A-1 which is already within the coupling mechanism of the receiving end of driver 12. Preferably, first and second parts 15A-1, 15A-2 self-center relative to one another when coupled together.

In some cases it may be difficult to perfectly align a pin end with the coupling mechanism of a driver. Having pin end 15A comprise plural members may advantageously make it easier for an operator to couple pin 15 to the driver. For example, first part 15A-1 which is pre-inserted into the coupling mechanism of the receiving end of a driver may be shaped to guide second part 15A-2 into a desired engagement with first part 15A-1 and/or the coupling mechanism of the driver. In some embodiments, first and second parts 15A-1, 15A-2 are shaped to self-center relative to one another.

Parts 15A-1 and 15A-2 may comprise at least one male feature or structure protruding longitudinally or axially outwardly from one of parts 15A-1 and and that male feature is configured by size and/or shape to be received within a corresponding female cavity of the other one of parts 15A-1 and 15A-2. The term "corresponding" in this context, as above, is not intended to indicate or imply fully corresponding features or elements. The cavity is shaped such that torque from a driver may be transmitted between the male protrusion and the female cavity. The direction of torque transmission may be from the male protrusion to the female cavity and/or from the female cavity to the male protrusion, depending upon whether the part with the male protrusion or the part with the female cavity is coupled to the coupling structure of the driver. The male protrusion and corresponding female cavity are preferably long enough such that torque can be appropriately transferred from a driver to traction pin 15. In some embodiments, the male protrusion and corresponding female cavity have a length, in a longitudinal or axial direction of shaft that is at least 60% of the total length of pre-inserted first part 15A-1.

Figure 3D:
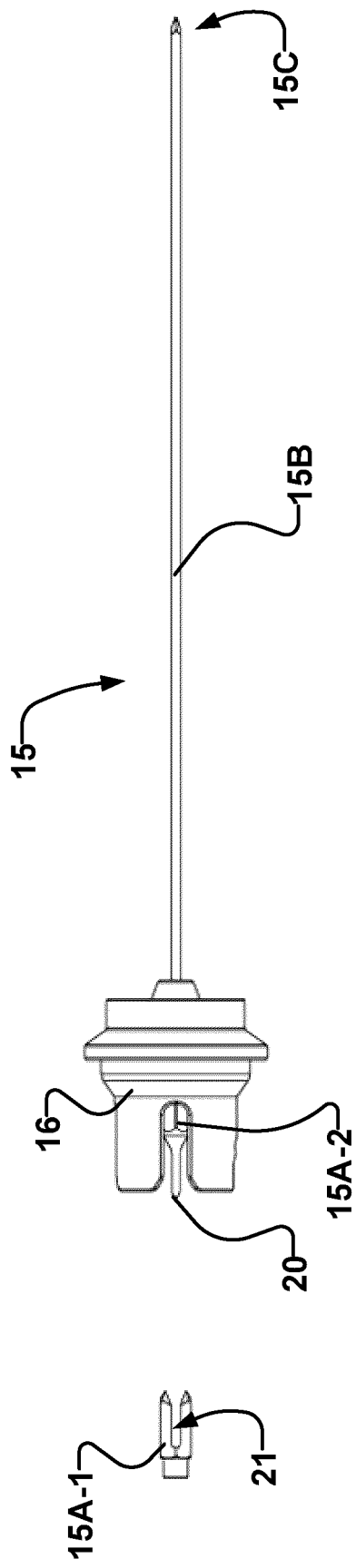
FIGS. 3D and 3E are schematic views of the traction pin of FIG. 3B coupled with an adapter according to an example embodiment of the invention.
Figure 3E:
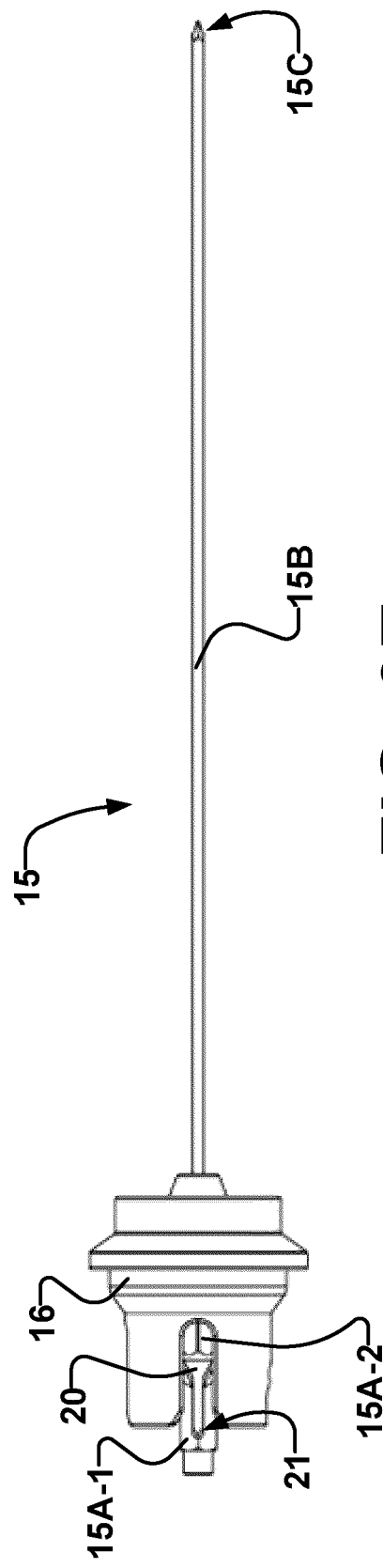

FIG. 3C is a perspective view of parts 15A-1 and 15A-2 coupled together. FIGS. 3D and 3E schematically illustrate placement of adapter 16 relative to parts 15A-1 and 15A-2.

Figure 3F:
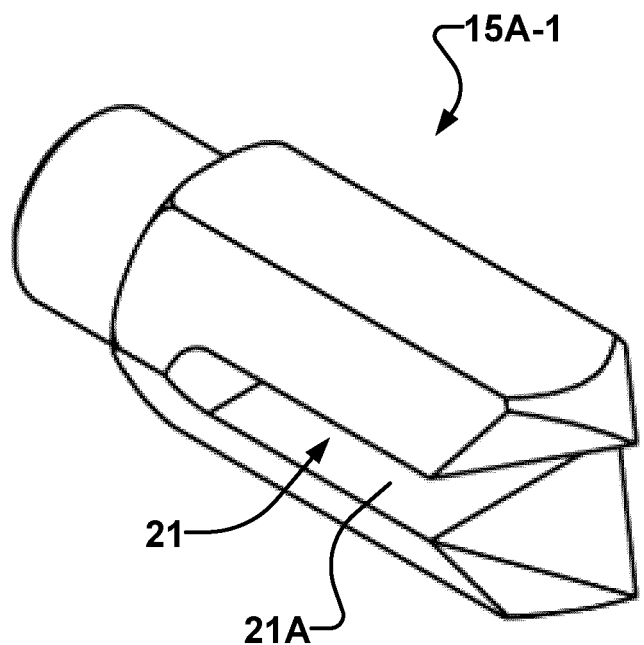
FIGS. 3F and 3G are perspective views of example members of the end of the traction pin of FIG. 3B.
Figure 3G:
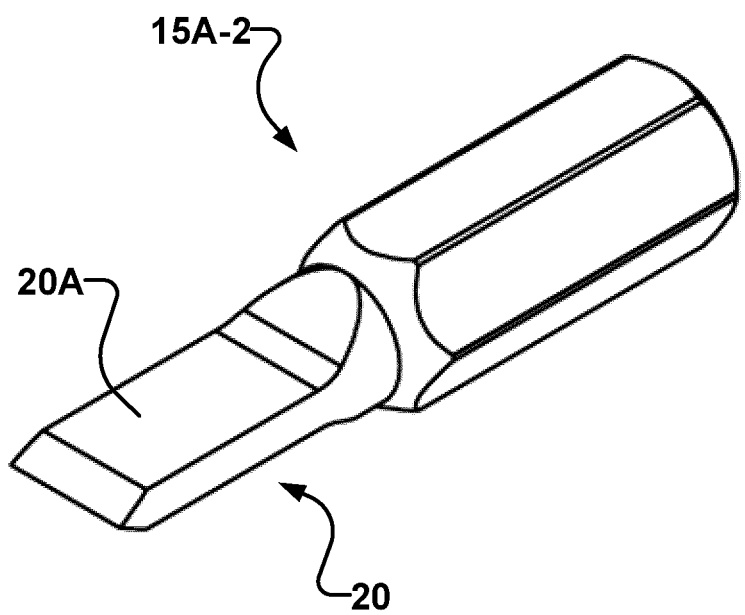
Figure 3I:
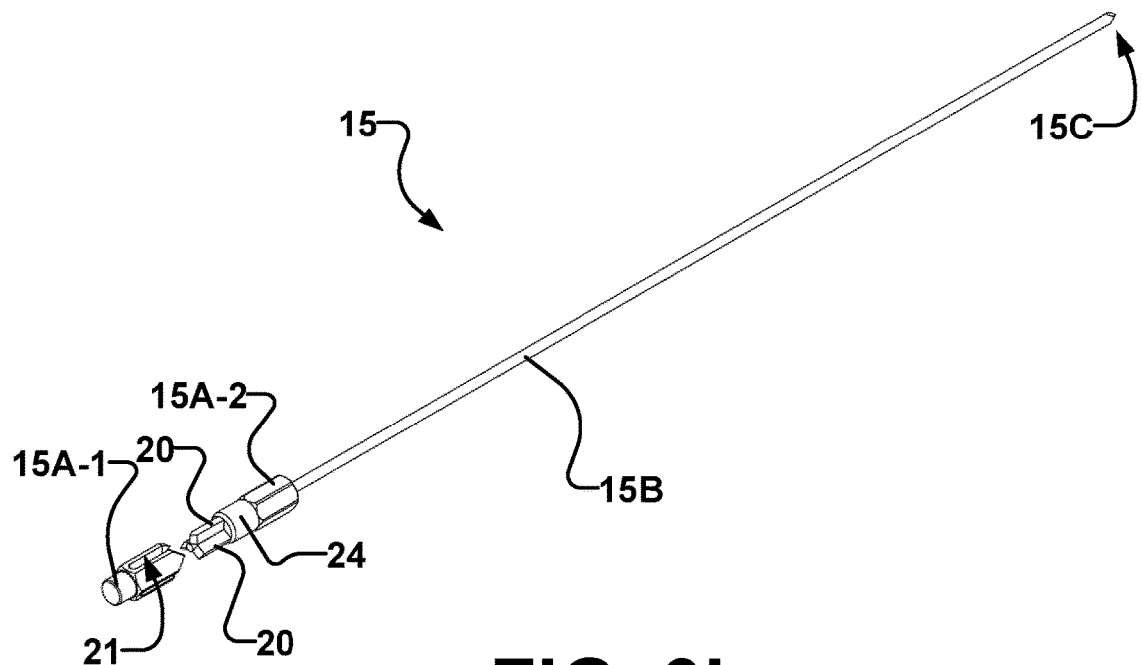
FIG. 3I is an exploded perspective view of a traction pin according to an example embodiment of the invention.
Figure 3J:
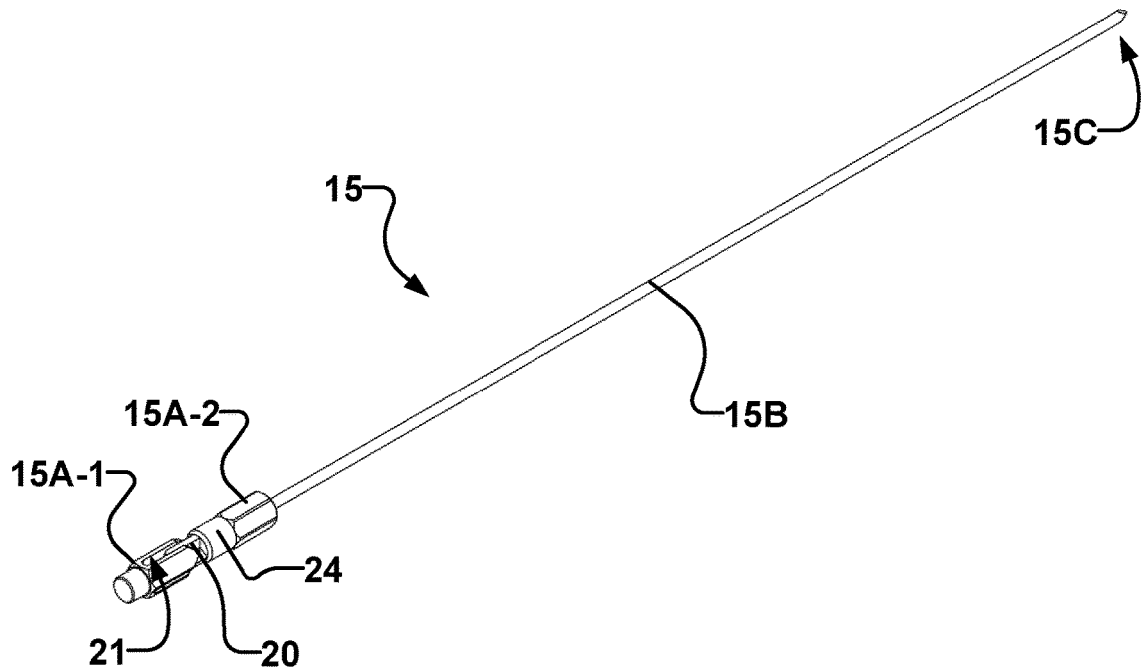
FIG. 3J is a perspective view of the traction pin of FIG. 3I.
Figure 3K:
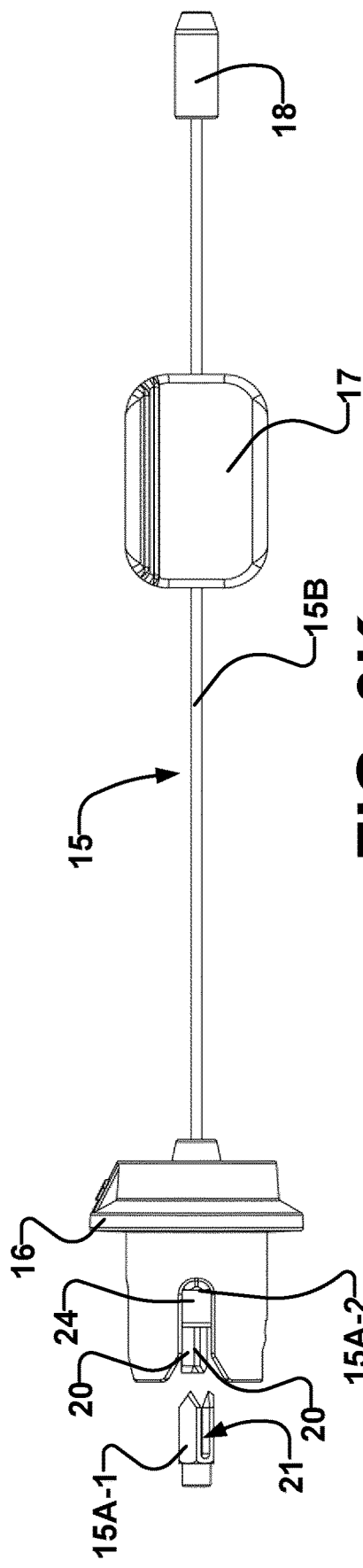
FIGS. 3K and 3L are schematic views of the traction pin of FIG. 3I coupled with an adapter and a guide according to an example embodiment of the invention.
Figure 3L:
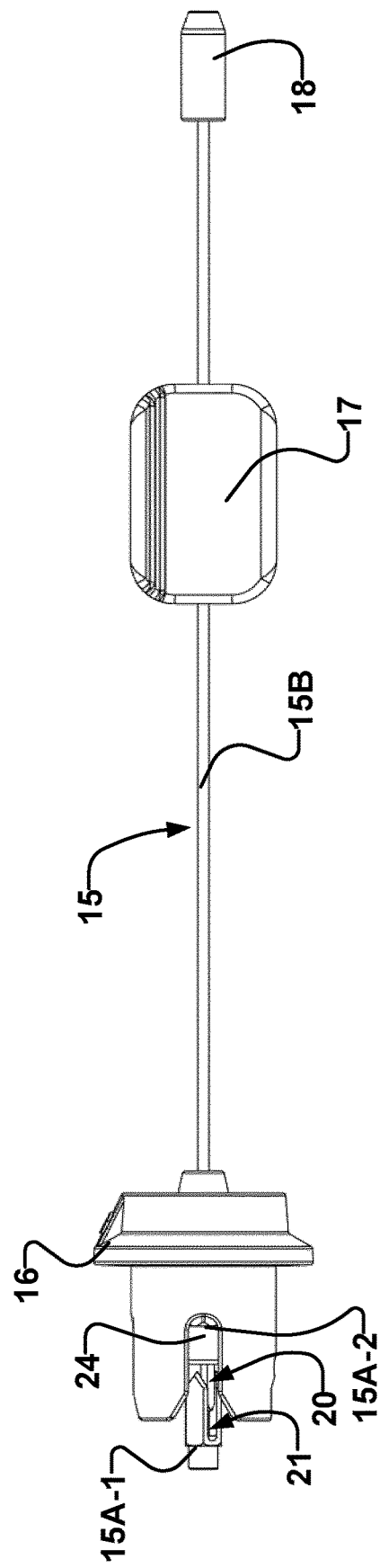
Figure 3M:
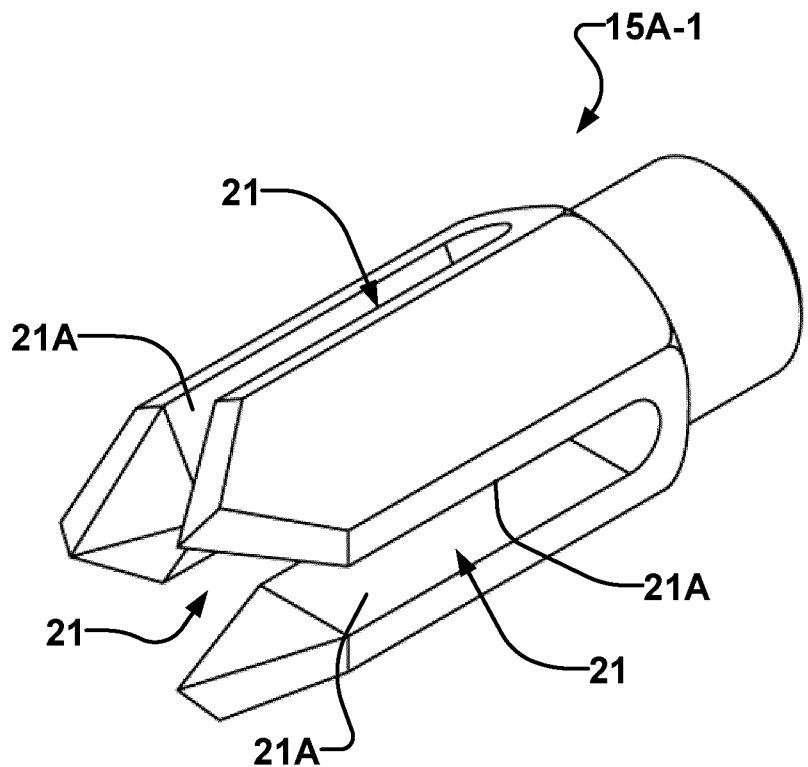
FIGS. 3M and 3N are perspective views of example members of the end of the traction pin of FIG. 3I.
Figure 3N:
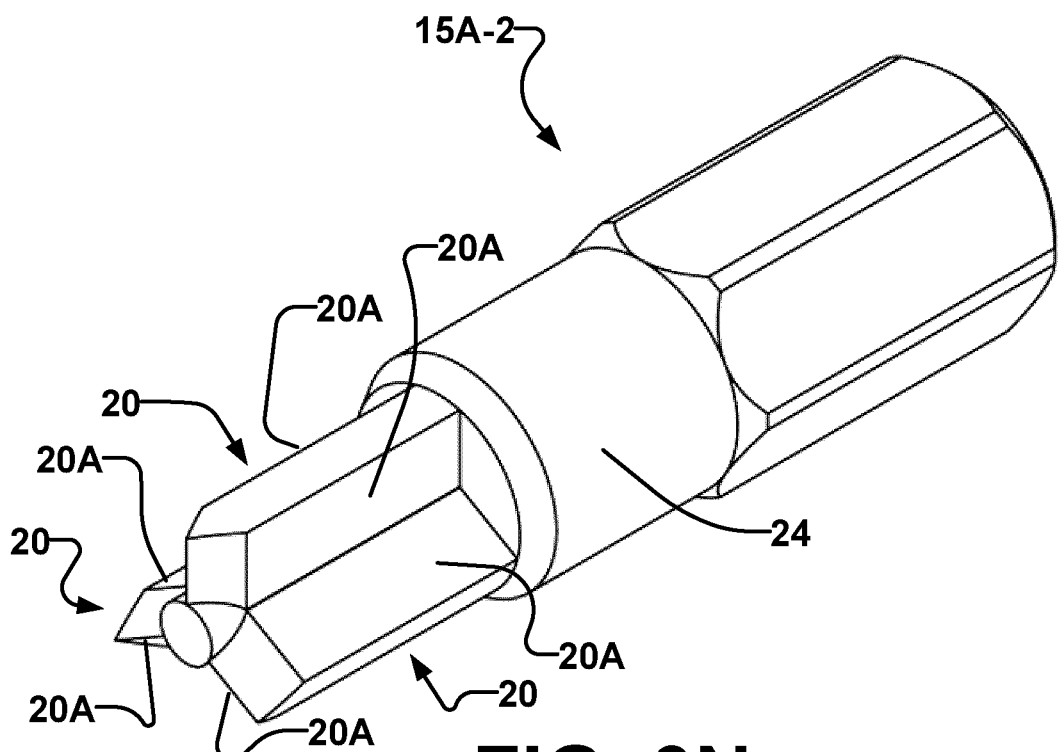

For example, part 15A-2 may comprise an outwardly extending spade to be received within a corresponding slot 21 of part 15A-1. Outer surfaces 20A of spade 20 may frictionally engage corresponding outer surfaces 21A of slot 21, as shown by way of example in FIGS. 3F and 3G. Surfaces of one or both of spade 20 and slot 21 may be angled or sloped. Having angled or sloped surfaces advantageously may assist with centering of part 15A-2 relative to part 15A-1. The surfaces may be angled or sloped at a single angle or multiple angles. In some embodiments, part 15A-1 comprises spade 20 and part 15A-2 comprises slot 21.

FIG. 3H is a schematic cross-sectional view of an example coupling of traction pin 15 with a corresponding receiving end of driver 12. In the illustrated example, traction pin 15, or specifically at least a pin end including parts 15A-1 and and part of the shaft of traction pin 15 in the example shown, is received within a cavity 22 of driver 12. Surfaces of parts 15A-1, 15A-2 of pin 15 may engage corresponding inner surfaces of cavity 22. Additionally, or alternatively, the coupling mechanism of driver 12 may comprise one or more features which engage corresponding features of end 15A of pin 15 to axially retain end 15A within the coupling mechanism. As shown in FIG. 3H for example, the coupling mechanism may comprise one ore more balls and/or ridges, shown by way of example at 23, which engage corresponding structures such as recesses, sloped end portions, or the like, of pin end 15A, or first part 15A-1 as shown. In some embodiments, pin end or one or both of first and second parts 15A-1, 15A-2, may be partially compressed or otherwise deformed for the features of the coupling mechanism of driver 12 to engage the corresponding features of end 15A as end 15A is inserted into the coupling mechanism of driver 12.

In some embodiments, parts 15A-1 and 15A-2 comprise a plurality of spades 20 to be received within corresponding slots 21. In some embodiments, parts 15A-1 and 15A-2 comprise three spades 20 to be received within three corresponding slots 21 as shown in FIGS. 3I to 3O. Each spade 20 may be uniformly or non-uniformly spaced around traction pin 15. In some embodiments, each spade 20 is angularly spaced apart from an adjacent spade 20 by 120°.

The member which comprises the male protrusion(s) may also comprise a shoulder. For example, part 15A-2 may comprise a shoulder 24. Shoulder 24 may have a circular cross-section. Shoulder 24 may center part 15A-2 within the coupling mechanism of driver 12 prior to spades 20 engaging their corresponding slots 21 of part 15A-1. This may advantageously prevent part 15A-2 from deflecting off-axis within the coupling mechanism of driver 12. If part 15A-2 deflects off-axis, then spades 20 may be prevented from aligning with their corresponding slots 21.

In some embodiments, shoulder 24 has a diameter or width that is slightly less than, such as less than 5% below, the diameter or width of the coupling mechanism of driver 12. For example, if the coupling mechanism of driver 12 is a hex coupling having a width of 0.25 inches (6.35 mm) from a flat portion of the hex to an opposing flat portion of the hex, then shoulder 24 may have a diameter that is inches (6.223 mm).

In some embodiments, edges that define slot(s) 21 are deburred. Deburring the edges may make inserting part 15A-1 into the coupling mechanism of driver 12 easier.

Figure 3O:
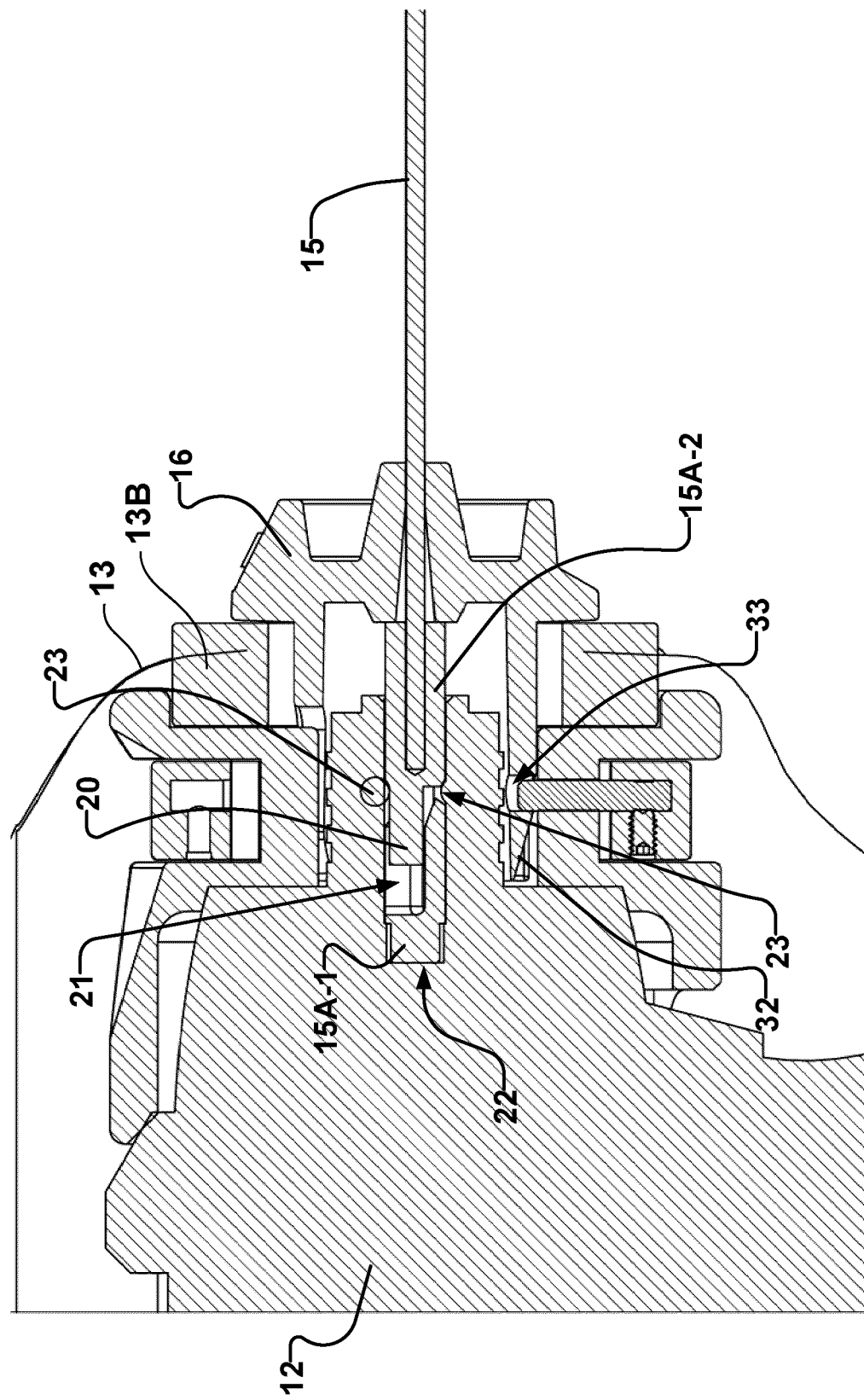
FIG. 3O is a schematic cross-sectional view of a coupling of the traction pin of FIG. 3I with a driver according to an example embodiment of the invention.

FIG. 3O is a schematic cross-sectional view of an example coupling of parts 15A-1 and 15A-2 which comprise a plurality of spades 20 and slots 21 with a corresponding receiving end of driver 12.

Figure 3P:
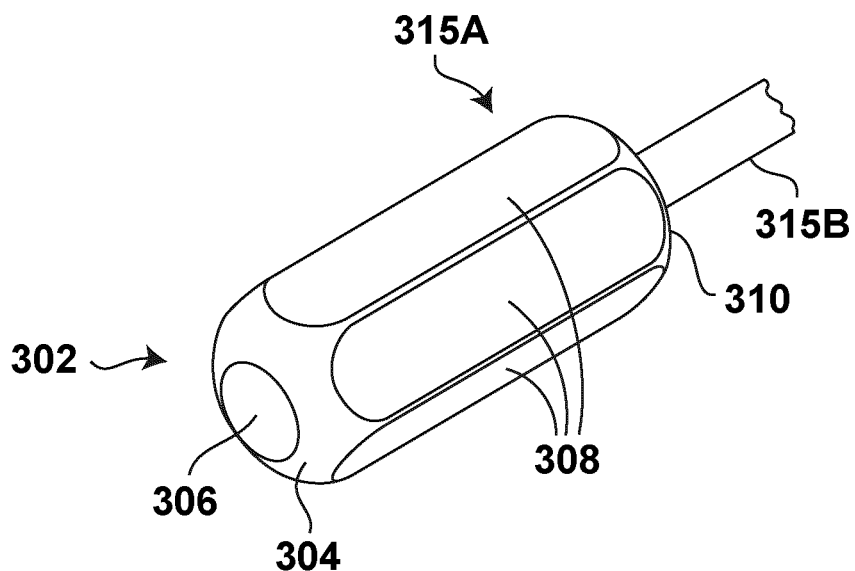
FIGS. 3P and 3Q are a perspective view and a side plan view, respectively, of a traction pin end of the example traction pin of FIG. 3A.
Figure 3Q:
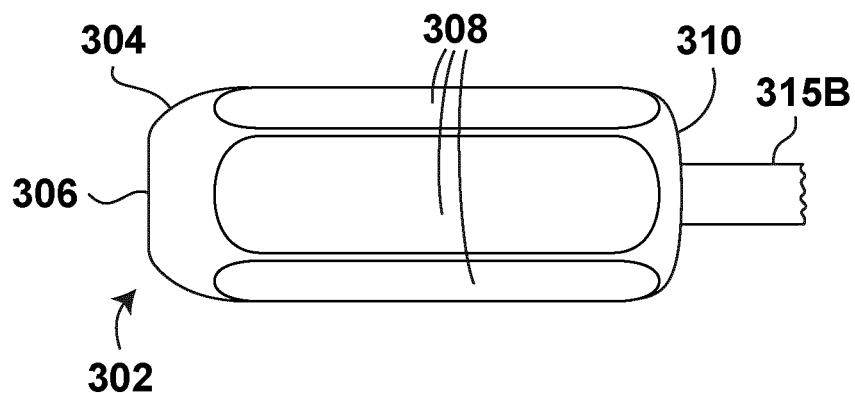

FIGS. 3P and 3Q are a perspective view and a side plan view, respectively, of a traction pin end of the example traction pin of FIG. 3A. Although FIGS. 3P and 3Q illustrate a single-part pin end, the features that are described with reference to these drawings may also apply to multi-part pin ends. For example, features that are provided at opposite ends of a pin end may be provided on different parts of a multi-part pin end.

An inner end or drive end 302 of the example pin end 315A, which would be inserted first into a coupling mechanism of a driver, has a rounded surface 304 between an end surface 306 and outer axial surfaces or side surfaces 308 of the pin end. This may be advantageous in helping to align the pin end 315A in coupling with the coupling mechanism so that the coupling mechanism properly engages the pin end to transfer torque from a driver to the traction pin shaft 315B. A sharp transition or sharp corners between the end surface 306 and outer axial surfaces or side surfaces 308 of a pin end may make it more difficult to properly orient the pin end, which can delay pin insertion. Time may be critical, especially for urgent care, emergency care, or unsafe environments, for example, to physically stabilize a patient as quickly as possible. The patient may need to be stabilized in order to be treated for more serious injuries or conditions, moved to other healthcare facilities or departments, or moved to safety, for example. Even for less time-critical applications, for scheduled surgery in an operating room setting for example, a drive end structure that facilitates coupling of a traction pin end to a driver may make a traction pin or traction pin assembly easier to use, providing another potential advantage.

The surface 304 is shown as a rounded surface as an example of a smooth or sloped guide surface or transition between the end surface 306 and the axial surfaces or side surfaces 308 of the pin end 315A. In this type of structure, vertices between the outer axial surfaces or side surfaces 308 also extend only partially along the pin end 315A, and end before the end surface 306, contributing to the smoothed or sloped guide surface or transition. In addition, it will be apparent from at least FIG. 3Q that pin end 315A has a smaller physical dimension, in particular diameter in the example shown, than a physical dimension of another part of the pin end, in particular distance between opposite surfaces 308 in the example shown. This makes at least initial orientation of pin end 15A relative to a driver coupling structure easier and less time consuming, in that an insertion end is smaller than another, larger, part of the pin end that the coupling structure is configured to accommodate or receive. Other surface shapes may also or instead be used in other embodiments to facilitate proper orientation of a traction pin end relative to a coupling mechanism of a driver.

At the outer end of the pin end 315A, opposite the drive end 302 and toward the pin shaft 315B, the pin end has a flat or substantially flat surface 310. This surface may be configured, in size and/or shape for example, to abut an inner surface of an adapter, so that the adapter retains the pin end 315A in engagement with a coupling mechanism of a driver. This is illustrated, for example, at the right-hand side of part 15A-2 in FIG. 3H. As shown, an end surface at the right-hand side of part 15A-2 abuts or engages an inner radial surface of adapter 16. With adapter 16 retained in place on the driver 12, the adapter 16 retains the pin end part 15A-2 axially in engagement with the pin end part 15A-1. A similar arrangement is shown in FIG. 3O. With a single-part pin end, a similar surface engagement between an end surface of the pin end as shown by way of example at 310 in FIG. 3Q and an inner radial surface of an adapter similarly retains the pin end axially relative to a coupling mechanism of a driver and in engagement with the coupling mechanism.

Although a traction pin is disclosed herein primarily as part of a traction pin assembly, system, or kit, a traction pin may itself embody new and useful features.

The Adapter

As shown perhaps most clearly in FIGS. 3H and 3O, adapter 16 comprises features which engage corresponding features of the receiving end of driver 12 to couple adapter 16 to driver 12. Again, "corresponding" in this context should not be interpreted as indicating or implying fully matching features or elements. Adapter 16 may help keep end 15A of traction pin 15 within a coupling mechanism of driver 12 while pin 15 is inserted into tissue of a patient. Once adapter 16 is coupled to the receiving end of driver 12, adapter 16 may become axially fixed, and does not move axially relative to driver 12, or at least axial travel of adapter 16 relative to driver 12 is sufficiently limited that end 15A of traction pin 15 is not uncoupled from the coupling mechanism of driver 12 until adapter 16 is uncoupled from driver 12. Additionally, adapter 16 may seal an opening of sterile cover 13 through which pin 15 passes.

Figure 4A:
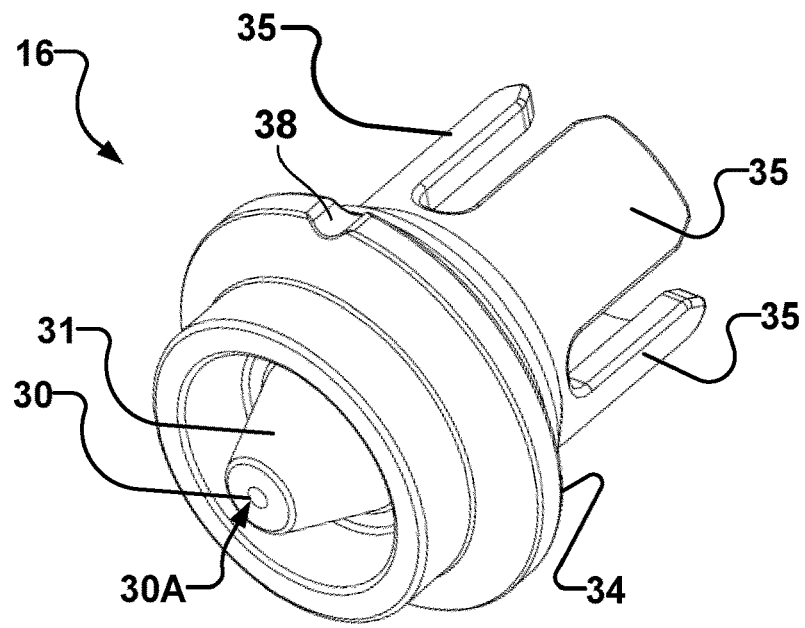
FIG. 4A is a perspective view of an adapter according to an example embodiment of the invention.

FIG. 4A is a perspective view of an example adapter 16.

Adapter 16 in part defines or comprises a hole 30 to accommodate a traction pin, and through which a traction pin passes or extends in a traction pin assembly. Inner surfaces of hole 30 may frictionally engage a traction pin. However, friction between inner surfaces of hole 30 and a traction pin is small enough to not prevent rotation of the traction pin within hole 30. In some embodiments, friction between inner surfaces of hole 30 and a traction pin is not uniform along all of hole 30. In some embodiments, friction between inner surfaces of hole 30 and a traction pin is highest at an outer end 30A of hole 30.

A diameter of hole 30 may be less than a diameter or width of pin end as shown by way of example in FIGS. 3H and 3O and is also apparent from other drawings such as FIGS. 1 and 2. Additionally, an inner surface of adapter 16 typically abuts an opposing end surface of pin end 15A when adapter 16 is coupled to driver 12, as also described at least above with reference to surface 310 in FIG. 3Q. These features advantageously help retain pin 15 axially relative to driver 12.

Hole 30 may be formed within a structure 31, which may be designed to support traction pin 15, by preventing transverse movement of traction pin 15 relative to adapter 16 for example. Structure 31 preferably extends longitudinally along a portion of pin 15, for example in a range of about 0.1 cm and 1.5 cm. Hole may completely extend longitudinally through structure 31. In some embodiments, hole 30 has a non-uniform diameter. For example, hole 30 may be conical or have another shape with non-uniform diameter. Structure 31 may be conical as shown in FIG. 4A but this is not mandatory. For example, structure 31 may be cylindrical, hexagonal, and so on.

Figure 4B:
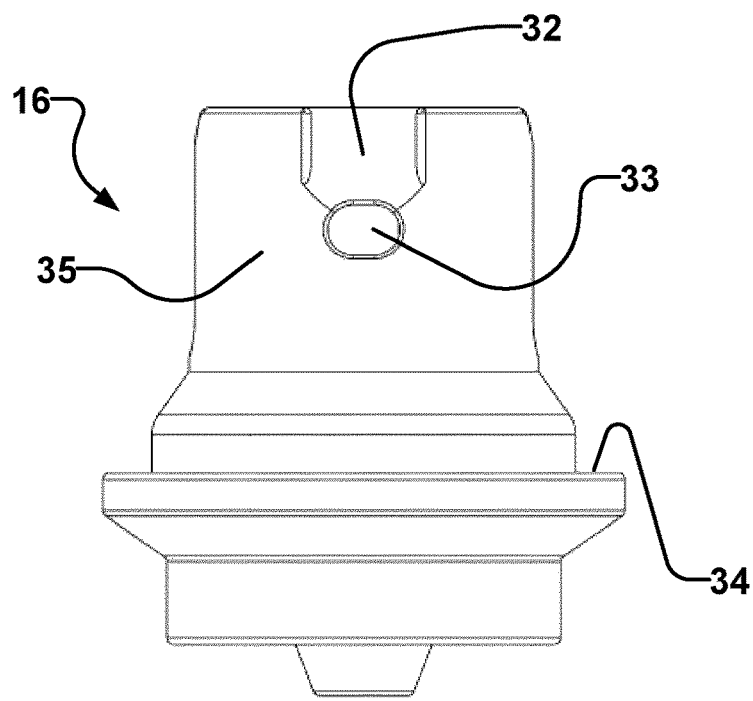
FIG. 4B is a bottom view of the adapter of FIG. 4A.

Inserting adapter 16 into the receiving end of driver 12 may, for example, slide a locking pin of the receiving end of driver 12 along ramp 32. See, for example, FIGS. 4B and 3H. Once adapter 16 has been sufficiently inserted, the locking pin may fall or be forced into recess 33, thereby locking adapter 16 relative to the receiving end of driver 12. In some embodiments, ramp 32 is configured to require adapter 16 to be pushed into the receiving end and twisted, clockwise and/or counterclockwise, prior to adapter 16 being locked relative to the receiving end of driver 12.

Additionally, coupling adapter 16 to driver 12 may automatically position a surface 34 of adapter 16 (see FIG. 4C, for example) a sufficient distance away from driver 12 to form a seal around an opening of sterile cover 13 through which adapter 16 and a traction pin pass. Such an opening is shown at 13A in FIG. 1. In some embodiments, sterile cover 13 comprises at least one gasket 13B (FIGS. 1, 3H, and 3O) such as a foam gasket surrounding the opening of sterile cover 13 through which adapter 16 and traction pin 15 pass. In such embodiments, coupling adapter 16 to driver 12 may automatically position surface 34 a sufficient distance away from driver 12 to compress the at least one gasket. Preferably, the engagement of surfaces of traction pin 15 with the opposing surface of hole 30 also seals sterile cover 13 and prevents matter from passing through hole 30.

Adapter 16 may, in some embodiments, comprise one or more guiding protrusions 35. Insertion of protrusions 35 into corresponding recesses of the receiving end of driver 12 may position adapter 16 in a desired orientation relative to driver 12. Again, "corresponding" in this context does not indicate or imply fully matching features or elements. The recesses may comprise filleted corners, and the protrusions 35 may also or instead include filleted corners as shown. The fillets at the filleted corners of the recesses and/or protrusions 35 may, for example, facilitate easier insertion of protrusions 35 into the recesses. In some embodiments, the recesses are dimensioned to frictionally engage surfaces of protrusions 35. Frictionally engaging surfaces of protrusions 35 may increase a strength of the coupling of adapter 16 to driver 12. In some embodiments, the recesses of the receiving end of driver 12 are formed between inner surfaces of walls of the receiving end of driver 12 and opposing surfaces of a coupling mechanism of driver 12.

Initially, for example when traction pin assembly 11 is removed from its packaging, adapter 16 may be positioned closer to a tip of traction pin 15, such as tip 15C in the views shown in FIGS. 3D and 3E, than to an end of traction pin 15, such as pin end 15A. This may encourage insertion of pin end 15A of traction pin 15 into a corresponding coupling mechanism of the receiving end of a driver before proceeding to couple adapter 16 to the receiving end of the driver. However, this is not mandatory.

Figure 4C:
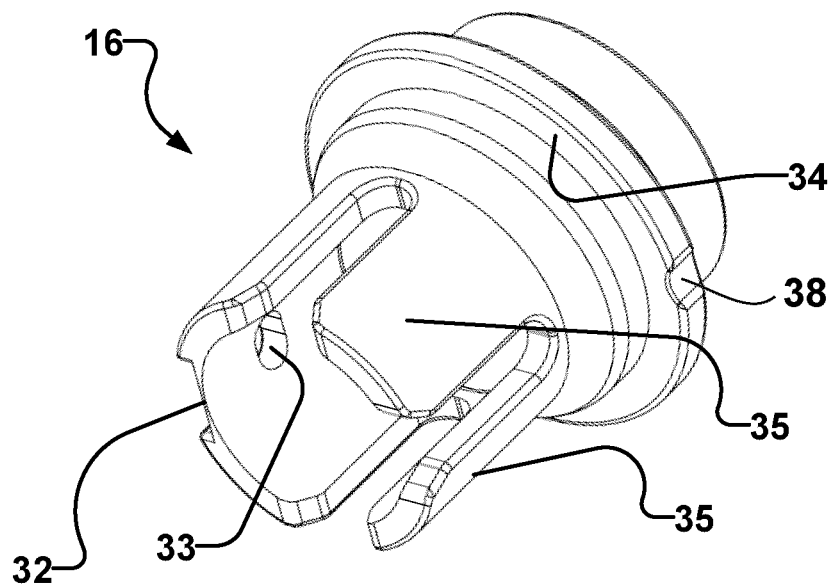
FIG. 4C is a perspective view of the adapter of FIG. 4A from an end of the adapter which is receivable in a receiving end of a driver.

In some embodiments, adapter 16 comprises one or more markings 36 indicating how adapter 16 is to be oriented relative to a driver. For example, adapter 16 may comprise a marking 36 such as the word "UP" indicating the surface or surfaces of adapter 16 that should be oriented upwards relative to a driver. See FIGS. 4D and 4E, for example. The notch shown at 38 in FIGS. 4A and 4C is another example of an orientation indicator. Having one or more markings 36 on adapter 16 may assist an operator to more quickly couple adapter 16 to a driver.

As noted above, an adapter may comprise one or more guiding protrusions 35. This, like other features, is not mandatory in all embodiments. FIGS. 4F and 4G are a perspective view and a plan view, respectively, of an adapter according to another example embodiment. Adapter 416 shown in FIGS. 4F and 4G is similar to adapter 16 described with reference to other embodiments, and includes similar features such as hole 30 with outer end 30A, and structure 31. These and other adapter features described elsewhere herein may be implemented in the embodiment shown in FIGS. 4F and 4G. There are, however, several notable differences between the embodiment shown in FIGS. 4F and 4G and other embodiments in FIGS. 4A to 4E.

For example, adapter 416 does not include multiple guiding protrusions, but rather has a single guiding protrusion 435, which may also or instead be referred to using other terms such as sleeve or collar. With a single guiding protrusion, adapter 416 may be inserted into a receiving end of a driver in any angular position or orientation relative to the receiving end. The protrusion 435 may be inserted into a recess of the receiving end without requiring the adapter to be oriented at any particular angular position relative to the receiving end. A recess for the adapter 416 may be an annular recess or circular opening, for example. This is an illustrative embodiment, and other guiding protrusion and recess shapes are possible.

An adapter such as adapter 416, which does not require a particular angular or rotational alignment with the receiving end of a driver, may be much easier and less time consuming to couple with the driver, because it can be inserted without first having to align multiple protrusions with multiple recesses. As disclosed elsewhere herein, time and ease of use can be important considerations in respect of traction pin insertion.

Adapter 416 also includes a different engagement or locking structure than other embodiments. The engagement or locking structure includes a ramp and a recess as in other embodiments, but the ramp 432 and recess 433 extend around the outer surface of protrusion 435 in adapter 416. This facilitates inserting adapter 416 into the receiving end of a driver to slide a locking pin of the receiving end of the driver along ramp 432 and into recess 433. With an annular ramp 432 and an annular groove or channel as recess 433, adapter 416 can be locked relative to the receiving end of the driver in any angular or rotational orientation relative to the driver, which can be advantageous as noted elsewhere herein.

Ramp 432 extending around the insertion end of adapter 416 may further assist in properly locating the adapter for insertion into a recess of the receiving end of a driver. For example, ramp 432 might not only facilitate insertion of adapter 416 pasta locking pin or other retaining element, but also make it easier to insert protrusion 435 into a recess. The insertion end of protrusion 435, at the top of the protrusion in the view shown in FIG. 4G, has a smaller diameter than the remainder of the protrusion, which makes it easier for a user to move the protrusion into a driver receiving end recess that is sized to accommodate the larger diameter of the remainder of the protrusion. More generally, an adapter may have an insertion end with a smaller physical dimension than another part of the adapter that is to be received in a driver recess.

Figure 4D:
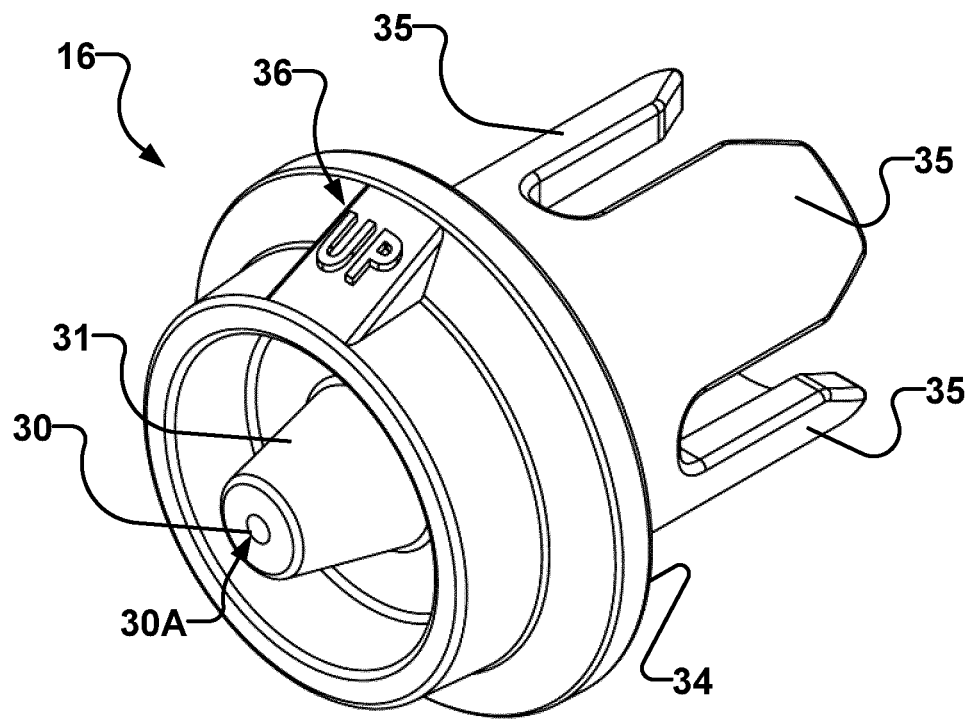
FIG. 4D is a perspective view of an adapter according to an example embodiment of the invention.
Figure 4E:
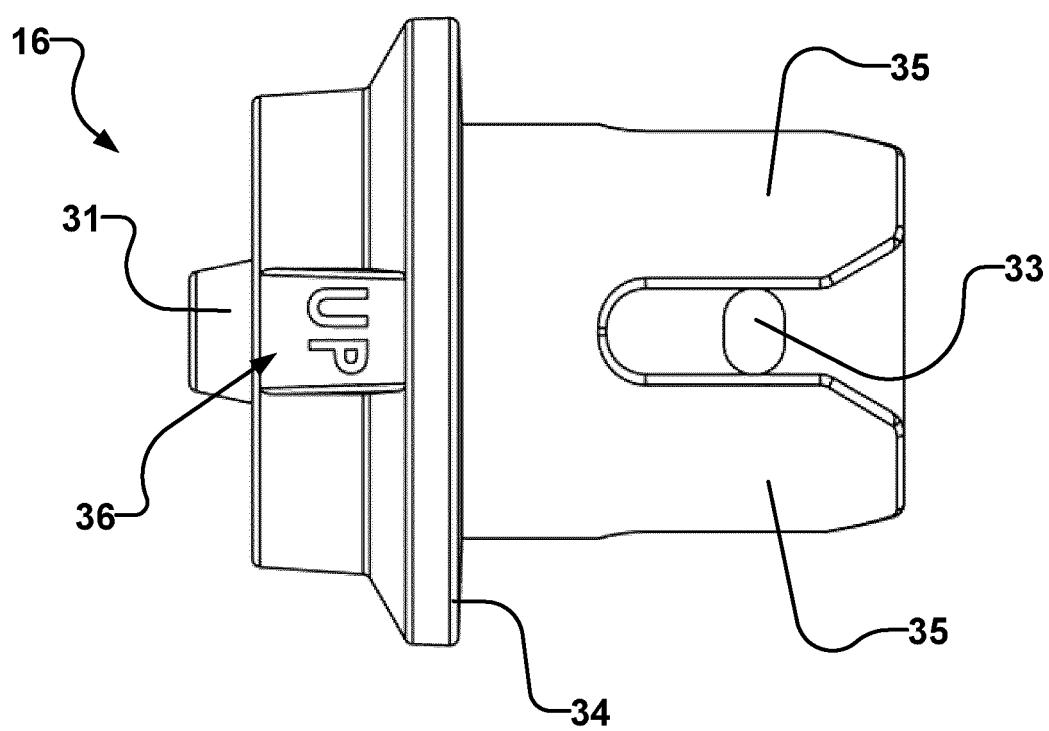
FIG. 4E is a top plan view of the adapter of FIG. 4D.
Figure 4F:
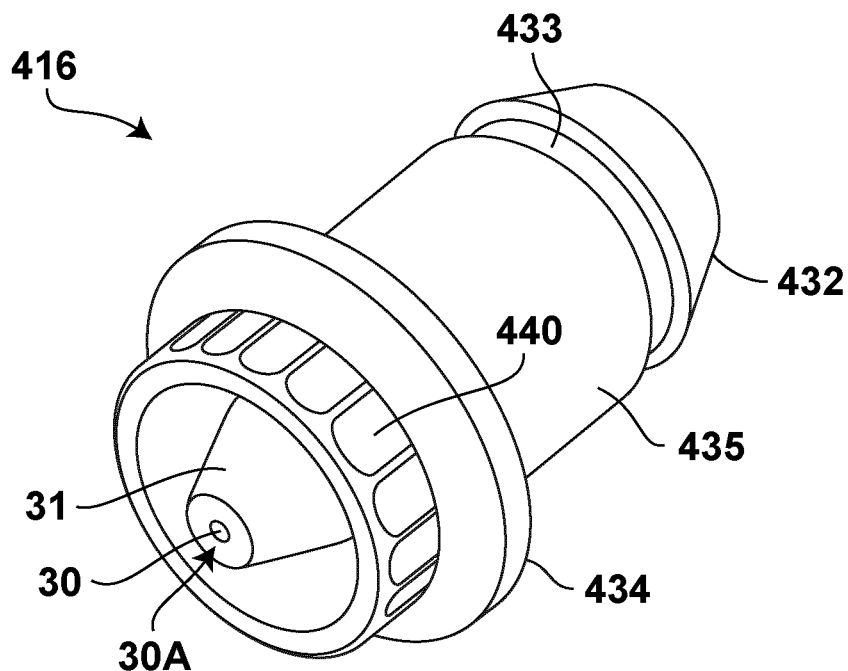
FIG. 4F is a perspective view of an adapter according to an example embodiment of the invention.
Figure 4G:
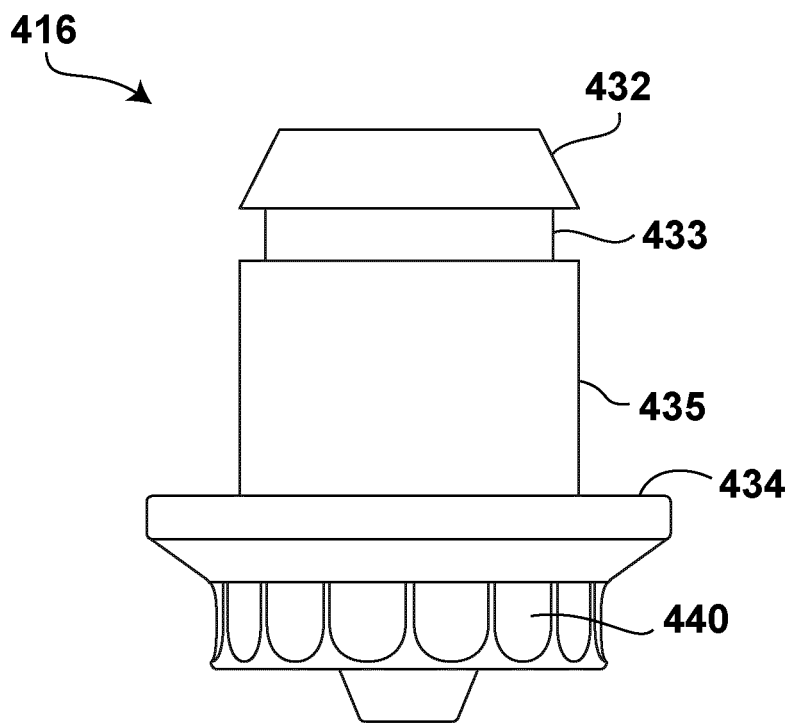
FIG. 4G is a plan view of the adapter of FIG. 4F.

Without any required angular or rotational orientation relative to a driver, adapter 416 need not include an orientation marking or indicator, such as the notch 38 in FIGS. 4A and 4C or the markings 36 in FIGS. 4D and 4E.

As in other embodiments, insertion of protrusion 435 into a recess of the receiving end of a driver may position adapter 416 in a desired orientation relative to the driver and/or a traction pin, for example to position surface 434 to form a seal around an opening of a sterile cover through which adapter 416 and a traction pin pass.

FIGS. 4F and 4G also illustrate other features that may be different between embodiments. One or more structures 440, such as notches, ridges, knurling, and/or other structures may be provided at or on an outer part adapter 416 to provide a non-smooth surface that may enable a user to better grip and manipulate the adapter during engagement with a driver and/or release from the driver for example. Adapter outer profile may also or instead be different in different embodiments. As is perhaps best visible from a comparison of FIGS. 4B, 4E, and 4G, an outer profile or surface of an adapter may be substantially uniform or smooth as shown by way of example in FIG. 4G, from an insertion end to surface 434, or may have a varying dimension such as diameter, as shown by way of example in FIGS. 4B and 4E. The outer profile of an adapter may be designed or otherwise configured based on one or more factors such as a cooperating profile of a driver receiving end and/or whether and how the adapter is to seal a driver cover, for example.

Other features may also or instead be provided in some embodiments. For example, features disclosed with reference to embodiments with multiple protrusions may be applied to embodiments with a single protrusion. Similarly, features disclosed with reference to embodiments with a single protrusion may be applied to embodiments with multiple protrusions. Protrusion features may apply to one protrusion, or to more than one protrusion, for example. Other adapter features may not be related to or dependent upon a number of protrusions, and accordingly may be implemented in conjunction with single-protrusion or multi-protrusion adapters.

Although an adapter is disclosed herein primarily as part of a traction pin assembly, system, or kit, an adapter may itself embody new and useful features.

The Guide

With reference again to FIG. 1, traction pin 15 has a small diameter relative to its length. During insertion of traction pin 15 into tissue, traction pin 15 may wobble and/or deform, for example by bending, and it may be desirable for traction pin 15 to be stabilized by an operator or user who is inserting traction pin 15 into tissue. An operator or user may be, for example, a physician, nurse, field medic, or veterinary practitioner, among others. When coupled to traction pin 15, guide 17 surrounds or at least engages a portion of shaft 15B of traction pin 15. This may provide an increased surface area which may be held by the operator to stabilize and/or steer traction pin 15, relative to the surface area that would be contacted by the operator if the operator were to hold the traction pin 15 directly. Another potential advantage of guide 17 is that traction pin 15 can be rotated inside or on guide 17. An operator can then hold guide 17 instead of traction pin 15, to avoid traction pin 15 potentially wrapping and/or damaging a glove during rotation. Such glove damage that may result from using a gloved hand to hold a traction pin directly, instead of using a guide, is a sterile breach. In some cases an operator holds onto guide 17 with one hand and uses their other hand to operate driver 12.

Figure 5A:
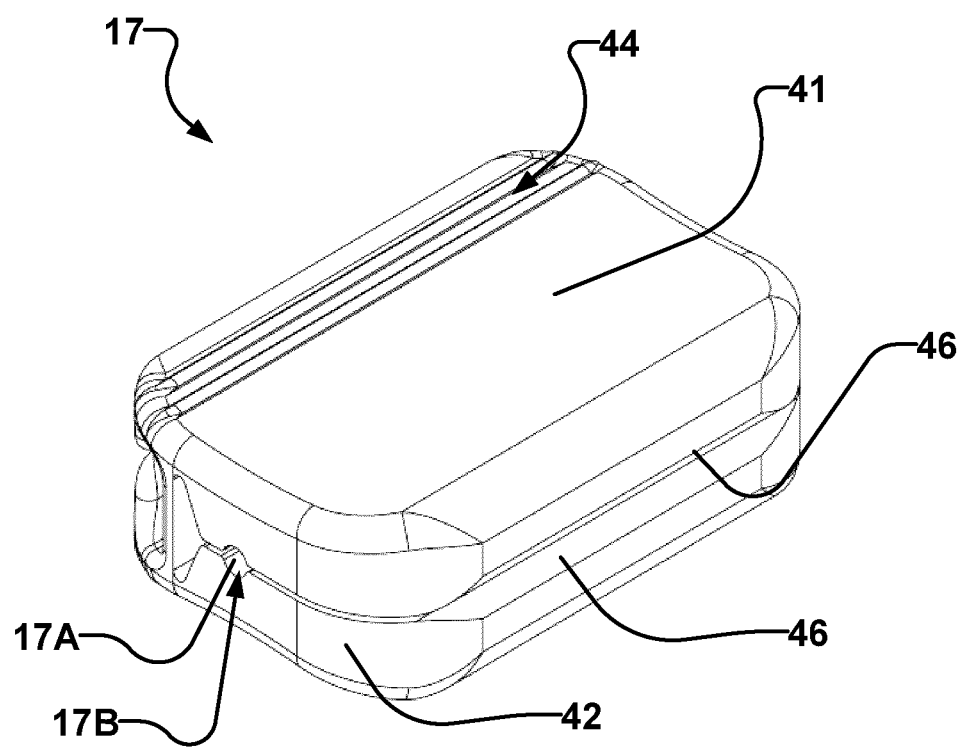
FIG. 5A is a perspective view of a guide according to an example embodiment of the invention.

As shown in FIG. 5A, guide 17 in an embodiment defines or comprises a passage 17A extending between apertures 17B and 17C through which a traction pin may extend when guide 17 is installed on a traction pin as shown by way of example in FIG. 2. Surfaces of passage 17A may frictionally engage opposing surfaces of shaft 15B (see FIG. 3A for example) of traction pin 15. Preferably, there is sufficient friction to axially retain guide 17 on a traction pin so that guide 17 does not slide off of or along the traction pin if the traction pin is pointed downwards, for example. Additionally, the friction preferably is not so high that rotation of a traction pin relative to guide 17 is severely impeded. In some embodiments, an amount of friction between surfaces of passage 17A and a traction pin may be varied. The coefficient of friction between surfaces of passage 17A and a traction pin may be varied, for example. In some embodiments, an amount of friction between surfaces of passage 17A and a traction pin may be varied by varying a width or other physical dimension of passage 17A. Width of passage 17A may, for example, be varied by squeezing portions of guide 17 together or apart more (to a greater extent) or less (to a lesser extent). In some embodiments, guide 17 is configured or designed, by shape and/or size relative to a traction pin for example, such that the friction between surfaces of passage 17A and the traction pin cannot exceed a threshold amount. For example, guide 17 is designed in some embodiments such that it cannot be squeezed or otherwise moved into engagement with a traction pin by more than a specific amount. Other arrangements or features to limit or otherwise control friction or engagement between guide 17 and a traction pin are possible.

Passage 17A is preferably centered with a longitudinal center axis passing through guide 17. However this is not necessary in all embodiments.

Figure 5B:
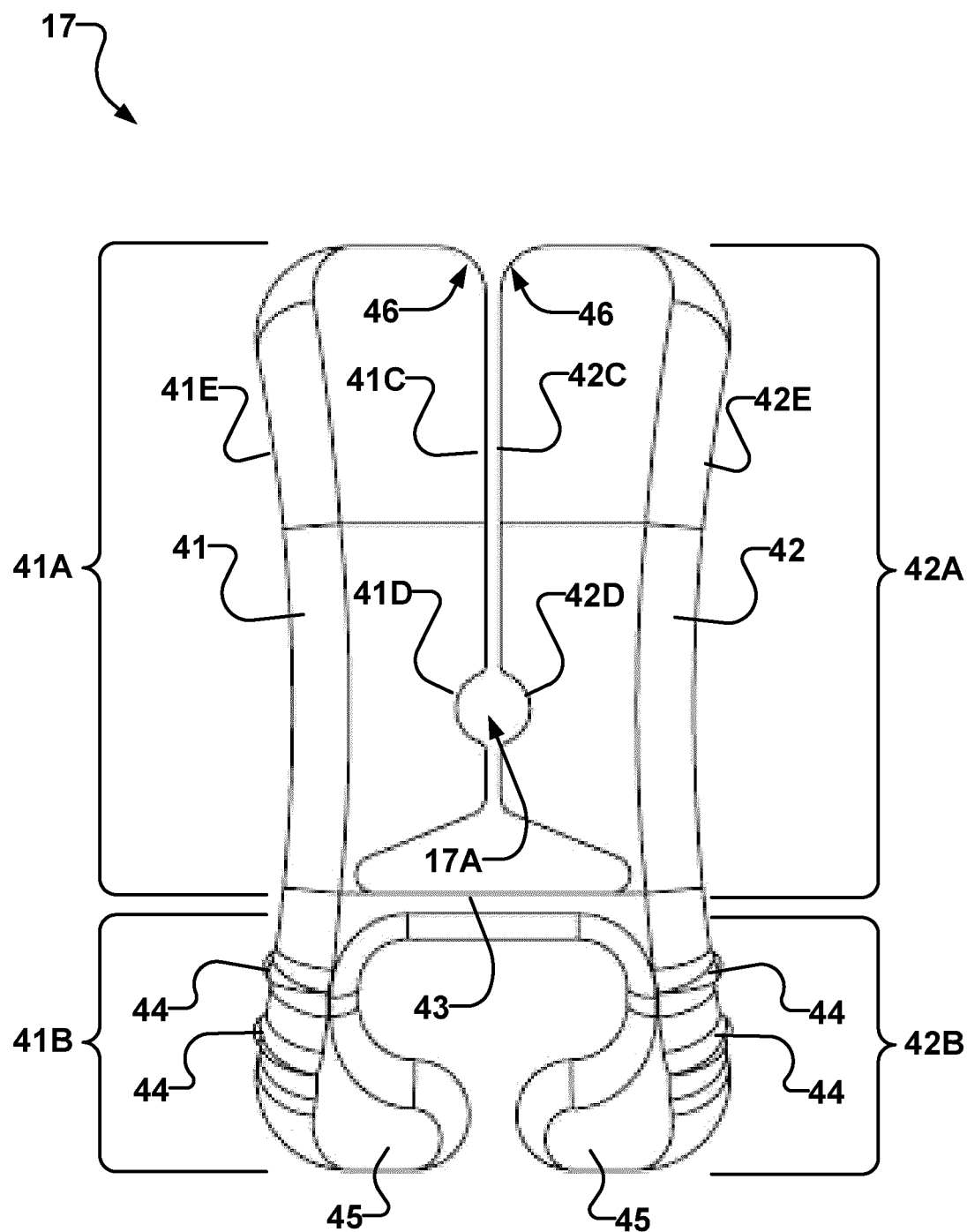
FIG. 5B is a side view of the guide of FIG. 5A.

In some embodiments, guide 17 is about:
- 4 cm±10% long (in the horizontal direction in the view shown in FIGS. 3K and 3L, for example);
- 2.5 cm±10% high (in the vertical direction in the view shown in FIGS. 3K and 3L, for example);
- 1.2 cm±10% wide (in the horizontal direction in the view shown in FIG. 5B, for example).

These example dimensions are solely for illustrative purposes, and one or more of these dimensions and/or shape of a guide may be different in other embodiments.

Guide 17 may comprise two parts which are hinged together. In some embodiments guide 17 comprises a pair of opposing halves 41 and 42 coupled together with a hinge 43 as shown in FIGS. 5A and 5B. Hinge 43 facilitates pivoting of halves 41 and 42 relative to one another. Each of opposing halves 41 and 42 may comprise a first portion 41A and 42A respectively and a second portion 41B and 42B respectively. First portions 41A and 42A may engage a traction pin 15. Pressing second portions 41B and 42B together may pivot first portions 41A and 42A away from each other.

Hinge 43 may be integral with one or both of halves 41 and 42 or a separate component of guide 17 which is coupled to halves 41 and 42. In an embodiment, hinge 43 brings halves 41 and 42 and/or first portions 41A and 42A together in its resting or unexcited state. In at least this sense, hinge 43 is an example of an element or a component that biases parts of a guide that are to releasably engage or accommodate a traction pin into or toward a usage position or usage condition of a guide. Parts of a guide may be biased toward each other, toward a traction pin, or toward a traction pin engagement position, holding position, or guiding position, for example, and these are all illustrative examples of a usage position or usage condition of a guide in which a guide is to be used for stabilizing, steering, supporting, or otherwise guiding a traction pin during insertion. Biasing in this manner may be preferred over biasing away from a usage position or condition of a guide, so that an operator need not apply force to a guide, or otherwise actively operate a guide, when a traction pin is being installed.

Inner surfaces 41C and 42C of first portions 41A and 42A respectively may each define or comprise a groove, such as grooves 41D and 42D, generally corresponding to a portion of passage 17A. In some embodiments, each groove defines about one half of passage 17A. In a resting state of guide 17, in which opposing halves 41 and 42 have not been pressed together in the embodiment shown, inner surfaces 41C and 42C may contact one another or may be separated from one another by a slight gap as shown in FIG. 5B.

Outer surfaces 41E and 42E of opposing halves 41 and 42 respectively may each comprise one or more features which make holding onto guide 17 easier, more comfortable, more ergonomic and/or the like for an operator. For example, outer surfaces 41E and 42E may be convex as shown in FIG. 5B. In some embodiments, outer surfaces 41E and 42E may be textured. For example, outer surfaces 41E and 42E may comprise ridges and/or grooves 44, making it easier for an operator to hold second portions 41B and 42B.

Optionally, second portions 41B and 42B may comprise tabs 45. Tabs may prevent hinge 43 from over-extending. As hinge 43 is opened, for example, by a person squeezing second portions 41B and 42B together, tabs 45 move together until they come into contact. Tabs 45 coming into contact with one another prevents hinge 43 from extending further, in that abutting tabs 45 prevent further pivoting of halves 41 and 42 relative to one another.

An amount by which hinge 43 may extend may, for example, be varied by any one or more of the following, among other possible approaches:

varying an amount of space between tabs 45;
varying a physical dimension such as length of tabs 45 in a direction toward each other in the view shown in FIG. 5B, for example;
varying inclination of tabs 45 relative to halves 41 and 42;
varying shape of tabs 45;
varying a thickness of hinge 43, in the vertical direction in the view shown in FIG. 5B, for example;
varying a location of hinge 43 relative to first portions 41A, 42A and second portions 41B, 42B,
varying a material or materials from which hinge 43 is made, for example by using more stiff material(s) or less stiff material(s), or other material selection criteria;
varying one or more dimensions (length, width, thickness, etc.) of guide 17.

It should be noted that not all embodiments necessarily include tabs 45 or other features to physically limit an amount by which hinge 43 may extend. An example is shown in FIG. 5D, which notably does not include tabs 45.

In some embodiments, first portions 41A and 42A comprise beveled or tapered edges 46. Beveled or tapered edges 46 may assist with centering of a traction pin relative to guide 17 and directing the traction pin into passage 17A.

In some embodiments, edges of guide 17 are beveled, chamfered and/or the like. This may, for example, assist with molding or other manufacturing of guide 17.

Friction between inner surfaces of passage 17A and a shaft of a traction pin may be uniform along a length of passage 17A or non-uniform.

In some embodiments, guide 17 is injection molded. Preferably, guide 17 is injection molded in one part. In some embodiments, guide 17 is injected molded in multiple parts. In some embodiments, guide 17 is injected molded in two parts. Passage 17A may be tapered outwards to assist with the injection molding. Outward tapering of passage 17A may create a positive draft angle, for example, to facilitate removal of a part from the mold. This is an example of a draft feature that may be provided in some embodiments to make guide 17, or one or more parts thereof, moldable. In embodiments with outward tapering, friction may be highest in or toward the middle of guide 17 where the two parts meet and grooves 41D and 42D defining tapered portions of passage 17A are closest to each other. Additionally, or alternatively, making passage 17A slightly tapered may simplify manufacturing of guide 17, for example because a precise tolerance then does not need to be maintained along an entire length of passage 17A.

Figure 5C:
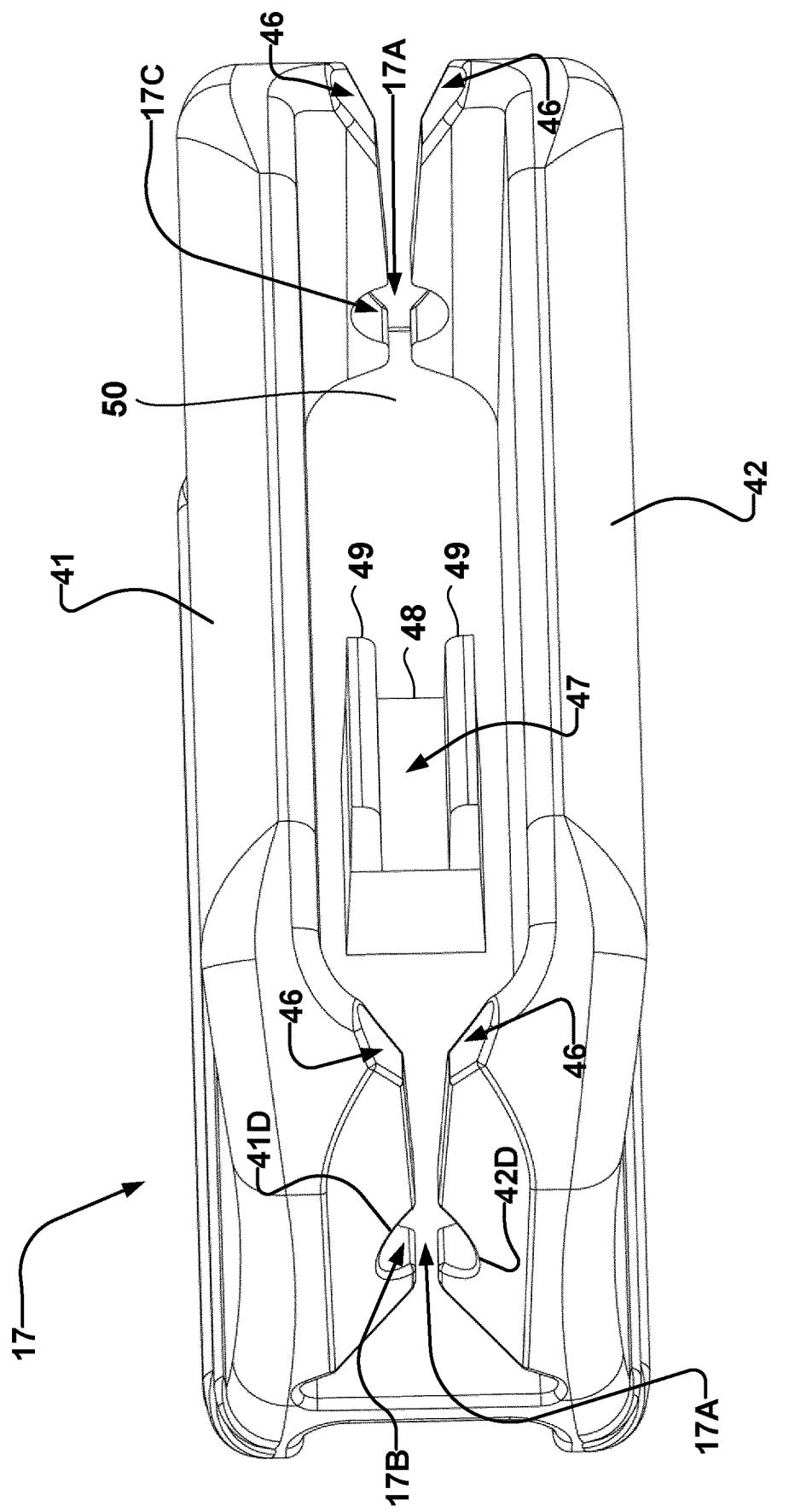
FIG. 5C is a perspective view of a guide according to an example embodiment of the invention.
Figure 5D:
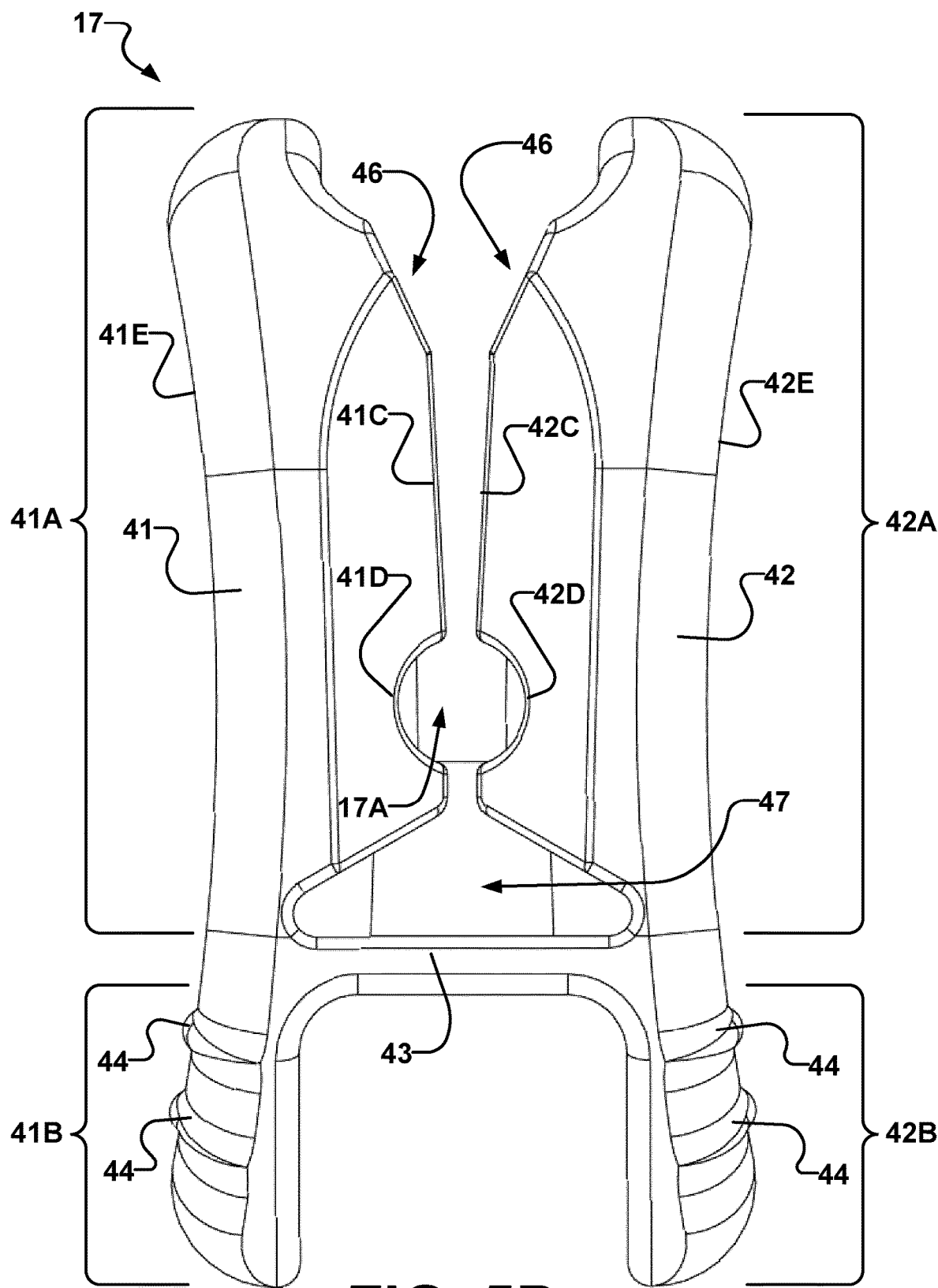
FIG. 5D is a side view of the guide of FIG. 5C.

In some embodiments, guide 17 comprises a clamp 47 located between apertures 17B and 17C, as shown by way of example in FIGS. 5C and 5D. In such embodiments, at least one inner surface of clamp 47 frictionally engages a traction pin. Friction provided by clamp 47 may be sufficient to retain guide 17 in its position relative to a traction pin so that guide 17 does not inadvertently fall off of the traction pin, such as when the traction pin is pointed downwards, the traction pin is moved, the traction pin is coupled to a driver, and so on. Friction provided by clamp 47 may retain guide 17 in a position relative to a traction pin without preventing rotation of the traction pin and also potentially without preventing movement of guide 17 relative to the traction pin by an operator or user. For example, clamp 47 may enable sliding of guide 17 along a traction pin by a user, and/or other relative movement between guide 17 and a traction pin. In some embodiments, clamp 47 may, for example, be a "U" shaped bracket. A generally "U" shaped bracket, with a base 48 and opposed side walls 49, is shown by way of example in FIG. 5C.

Another example of a clamp includes two opposed side walls without a base 48. For example, side walls may extend from a surface 50, and may potentially flex with hinge 43. Such side walls may be generally similar to side walls 49, but without a base 48. Although a base surface may provide additional support for a traction pin, in some embodiments sufficient support for a traction pin is provided by side walls, without a base. Other shapes and types of clamp may also or instead be provided.

Clamp 47 is located at a point along passage 17A between apertures 17B and 17C. In an embodiment, clamp 47 is located at a midpoint between apertures 17B and 17C.

In some embodiments, including at least embodiments in which guide 17 comprises a clamp such as clamp 47 for example, apertures 17B and 17C may be enlarged such that grooves 41D, 42D which define apertures 17B and 17C do not engage the outer surface of a traction pin. This may advantageously prevent binding of guide 17 to a traction pin when halves 41 and 42 are squeezed together, while maintaining sufficient friction between inner surfaces of clamp 47 and the traction pin such that guide 17 does not slide axially relative to the traction pin if the traction pin is pointed downwards for example. An operator may be attempting to insert a traction pin into a patient in a time-critical, dangerous, or otherwise stressful environment or scenario, and may unintentionally squeeze halves 41, 42 of guide 17 together too hard. With one or both apertures 17B and 17C being sized with a physical dimension that is larger than a counterpart dimension of a part of a traction pin that is to be located in passage 17A, the likelihood of binding the traction pin as a result of force applied to guide 17 by an operator may be eliminated or at least reduced. Such aperture sizing relative to traction pin size may also or instead be useful in providing a clamp, such as clamp 47, that releasably engages the shaft of a traction pin with an engagement force that is independent of gripping force applied to outside surfaces of the guide 17.

In some embodiments, inner surfaces of clamp 47 comprise features which prevent transverse movement of a traction pin relative to guide 17. For example, inner surfaces of clamp 47 may comprise one or more ridges, extending in any of various directions, which maintain a position of a traction pin relative to guide 17.

Apertures 17B and 17C may be the same or different. In some embodiments, apertures 17B and 17C are circular. In some embodiments, at least one of apertures 17B and 17C is non-circular. For example, one of apertures 17B and 17C may be cordate, as shown by way of example in FIG. 5C. Having a non-circular aperture may allow a user to more easily separate guide 17 from a traction pin one end at a time, as shown by way of example in FIG. 7H.

Figure 5E:
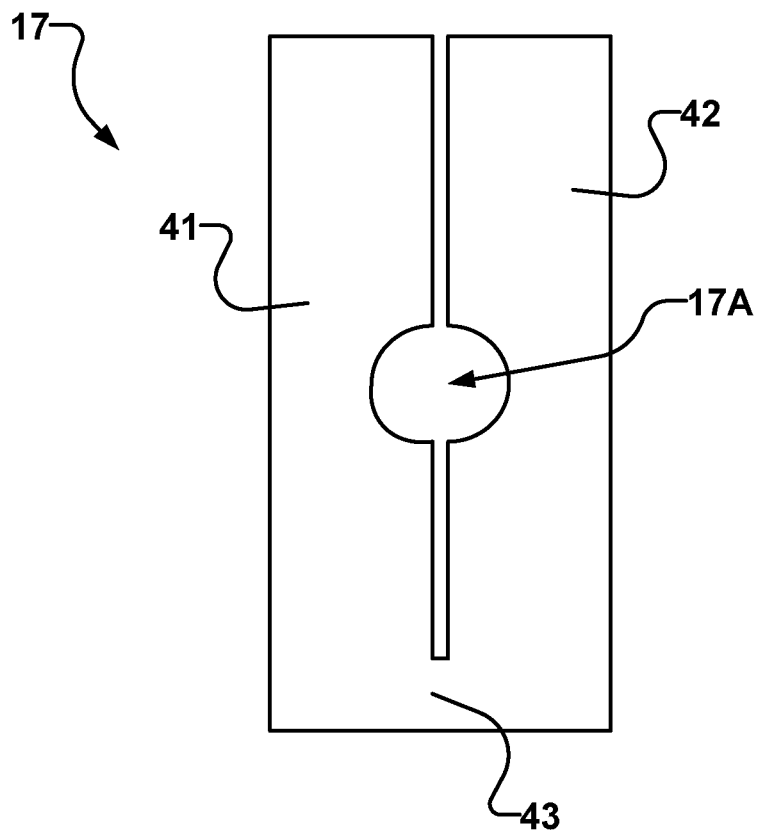
FIG. 5E is a side view of a guide according to an example embodiment of the invention.

In some embodiments, hinge 43 is on an outside edge of guide 17, as shown by way of example in FIG. 5E. The representation in FIG. 5E is simplified, but a guide with a hinge at an outside edge may include one or more guide features disclosed elsewhere herein.

In some embodiments, guide 17 comprises a solid geometrical figure and passage 17A passes through the geometric figure. In some embodiments, guide 17 is cylindrical, as shown by way of example in FIG. 5F. In some embodiments, guide 17 is barrel-shaped, as shown by way of example in FIG. 5G. The representations in FIGS. 5F and 5G are simplified, and guides consistent with these drawings may include one or more guide features disclosed elsewhere herein.

Figure 5F:
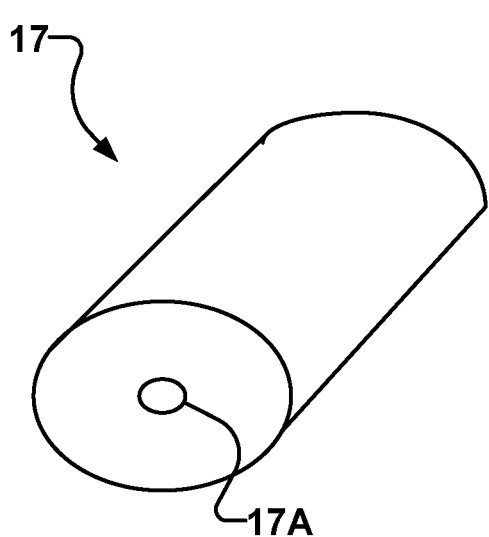
FIGS. 5F and 5G are perspective views of guides according to example embodiments of the invention.
Figure 5G:
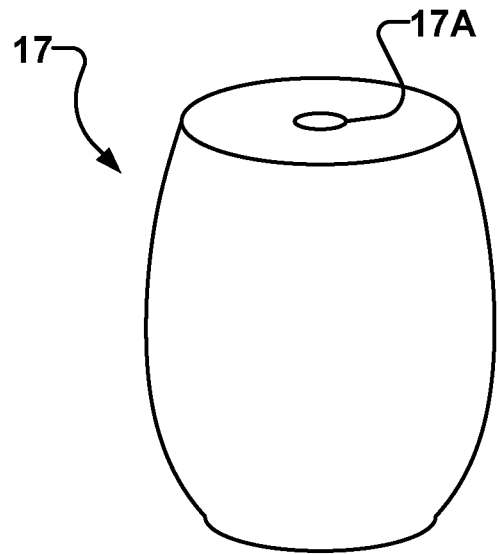

FIGS. 5A to 5E provide illustrative examples of guides that may be opened or otherwise manipulated for coupling to a traction pin at any position along a traction pin, and FIGS. 5F and 5G provide illustrative examples of guides that may be slid onto an end of a traction pin and along the traction pin to a target position. Other guide shapes and designs are also possible.

Although a guide is disclosed herein primarily as part of a traction pin assembly, system, or kit, a guide may itself embody new and useful features.

The Cap

Figure 6A:
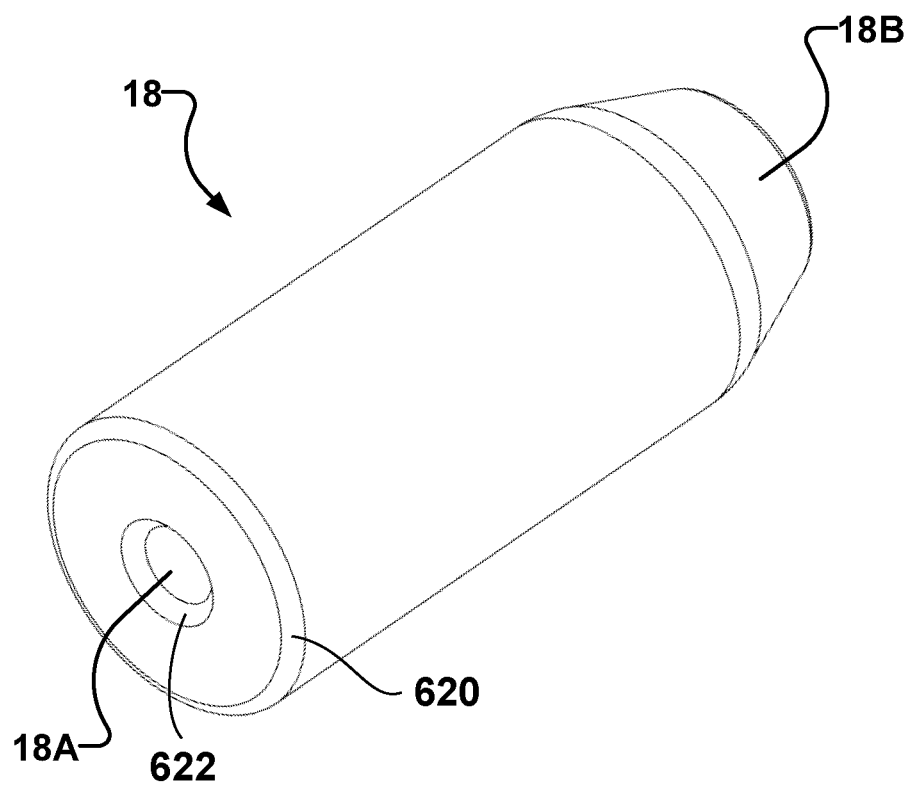
FIG. 6A is a perspective view of a cap according to an example embodiment of the invention.
Figure 6B:
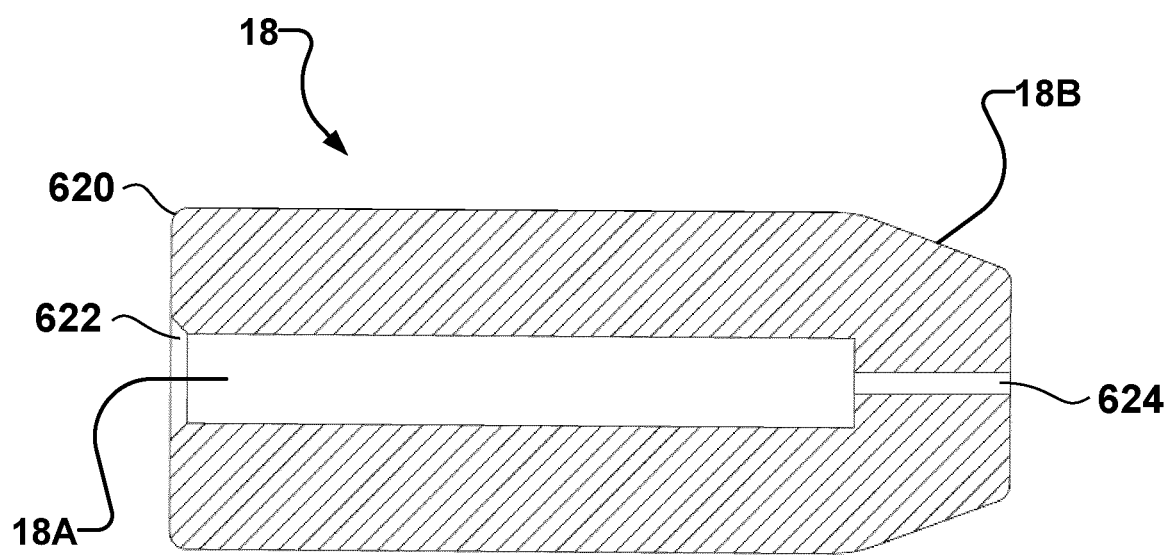
FIG. 6B is a cross-sectional view of the cap of FIG. 6A.

Optional cap 18 defines or comprises a cavity 18A extending longitudinally through a portion of cap 18, as shown by way of example in FIG. 6A. Cavity 18A preferably does not extend all the way through cap 18 such that tip 15C of traction pin 15 (shown in FIG. 3A, for example) is completely covered by cap 18 when pin 15 is inserted into cap 18. FIG. 6B is a cross-sectional view of the cap of FIG. 6A, and illustrates cavity 18A extending only partially through cap 18.

Cap 18 may comprise a tapered end 18B as shown in FIG. 6A that is blunt. Cap 18 may be made of a flexible material such as silicone, rubber, and/or the like. In some embodiments, cap 18 is made of a hard plastic. Cap 18 may be made from the same material(s) as an adapter, a guide, and/or a drive end or pin end of a traction pin.

A sloped interior surface 622 at a traction pin receiving end of cap 18, at the opening of cavity 18A, may be useful to facilitate placement of cap 18 over an end, such as a sharp tip, of a traction pin. The sloped surface 622 may make it easier and less time consuming to position cap 18 relative to an end of a traction pin so that the cap can be placed over the end of the pin and part of the pin can be slid into the cap. Another potential benefit of facilitating cap installation is reducing the likelihood of a puncture from a sharp tip of a traction pin during installation of cap 18 as an operator or user attempts to find the correct relative positions of the cap and traction pin for installing the cap.

Placing cap 18 over tip 15C of traction pin 15 protects against inadvertent injury or puncturing of tissue that may occur as a result of tissue coming into contact with tip 15C of traction pin 15 prior to or after traction pin 15 being inserted into a patient's tissue. For example, an operator of system 10 as shown in FIG. 1 may remove cap 18 immediately prior to inserting traction pin 15 into a patient's tissue, and/or after inserting traction pin 15 into the patient's tissue.

Other features may be provided in a cap. An edge of cap 18 may be rounded or otherwise smoothed or softened as shown by way of example at 620, to avoid a sharp edge that may come into contact with a user or a patient.

Another optional feature is shown in FIG. 6B. In some embodiments, a cap is intended to be removed from a traction pin, prior to insertion for example. Contact between a traction pin and the surface(s) of cavity 18A may impede airflow, and make it more difficult and time consuming to remove cap 18 from the traction pin. The cap end 18B may define or provide an air channel 624 to enable fluid communication between the cavity 18A and an exterior of cap 18. This might not only make it easier to remove cap 18, but also or instead make installation of cap 18 onto a tracking pin easier by potentially reducing the amount of force required to slide the cap onto the tracking pin. Air channel 624 is smaller than cavity 18A, to prevent a traction pin from extending entirely through cap 18 and in effect defeating the purpose of the cap.

An air channel as shown at 624 is just one example of how an air lock or air resistance effect may be reduced. An air channel may also or instead be provided at a different position, including through a side wall rather than an end wall of a cap. Another option is to provide one or more ridges or other structures on the interior surface(s) of a cap cavity, such that a traction pin is still engaged by a cap when the cap is installed on the traction pin, but air is able to flow in an air channel between the cap and the traction pin during installation or removal of the cap.

Figure 6C:
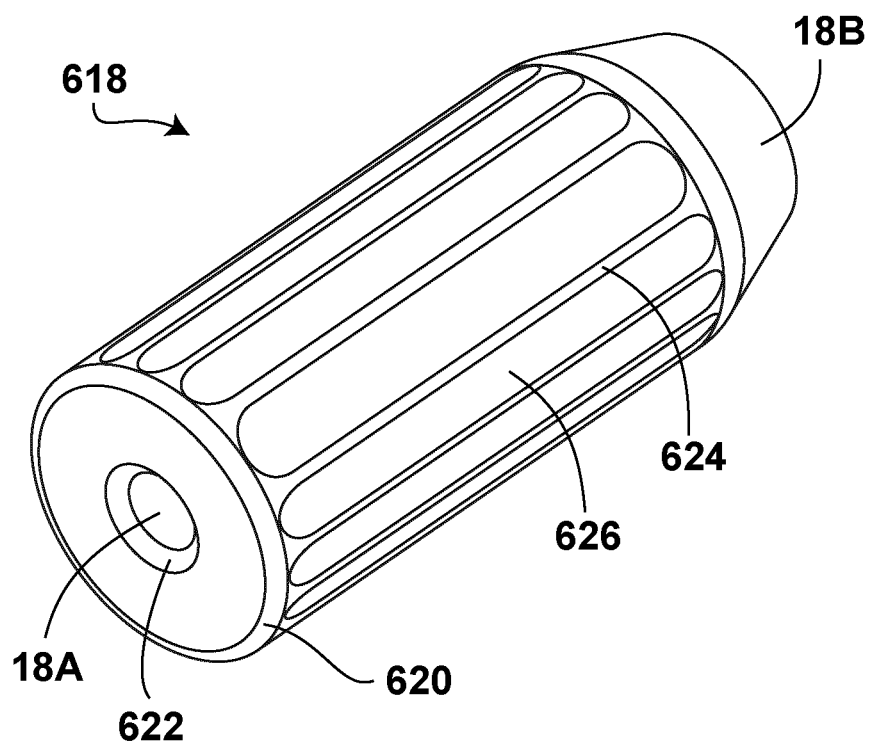
FIG. 6C is a perspective view of a cap according to another example embodiment of the invention.

FIG. 6C is a perspective view of a cap according to another example embodiment of the invention, and illustrates yet another optional feature that may be provided in some embodiments. Cap 18 as shown by way of example in FIG. 6A is substantially cylindrical, with smooth outside surfaces. In FIG. 6C, surface structures are shown by way of example as ridges 624 and channels or grooves 626. Such surface structures may be provided in some embodiments to improve grip and better enable twisting or turning of cap 618 during installation on or removal from a traction pin. Other types of surface features or structures, such as knurling, may be provided in other embodiments.

Although a guide is disclosed herein primarily as part of a traction pin assembly, system, or kit, a guide may itself embody new and useful features.

Example Methods of Use

FIGS. 7A to 7K illustrate example steps or operations that may be performed when inserting a traction pin into tissue of a patient using a system as disclosed herein. Although these drawings and the related description include reference characters that may be associated with particular disclosed embodiments, in general method features may apply to all disclosed embodiments of a traction pin assembly, a system, or components thereof.

In the illustrated example method, driver 12 is a commercially available power tool. In some embodiments, it is also desired for driver 12 to be sterile, although this is not in any way required where sterility may be provided by a cover or otherwise.

Figure 7A:
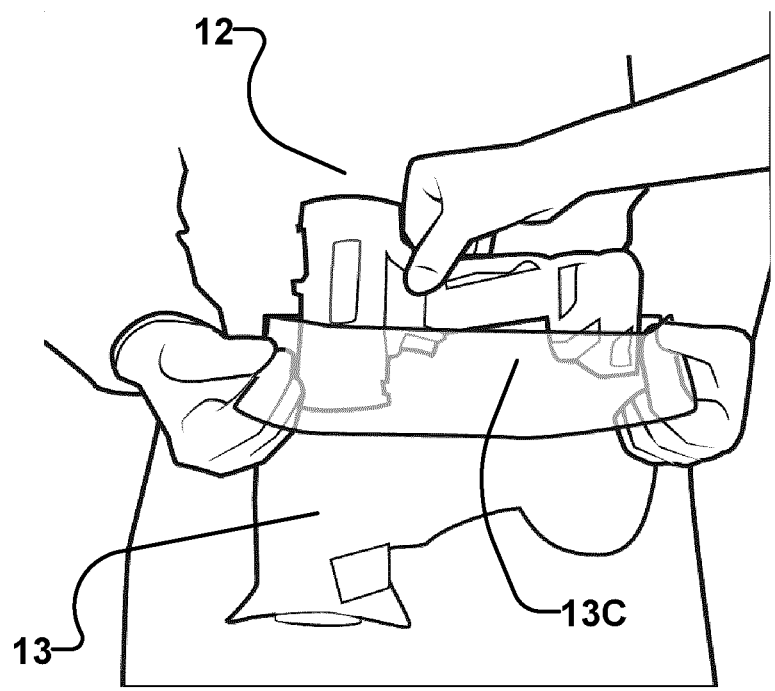
FIGS. 7A to 7K illustrate steps of a method for inserting a traction pin into tissue according to an example embodiment of the invention.

In FIG. 7A, driver 12 is inserted into sterile cover 13. Cover 13 may comprise a folded over edge portion 13C which may be used to hold sterile cover 13 while driver 12 is being inserted into sterile cover 13 without compromising sterility of the sterile outer surface of sterile cover 13. This reduces the likelihood that non-sterile driver 12 will contact a sterile outer surface of sterile cover 13 as driver 12 is being inserted into sterile cover 13. Sterile cover 13 may, for example, be held with hands that are sterile, or in other words the person holding sterile cover 13 has "scrubbed in" as may be known in the art, while driver 12 may be inserted by a person who does not have sterile hands.

Figure 7B:
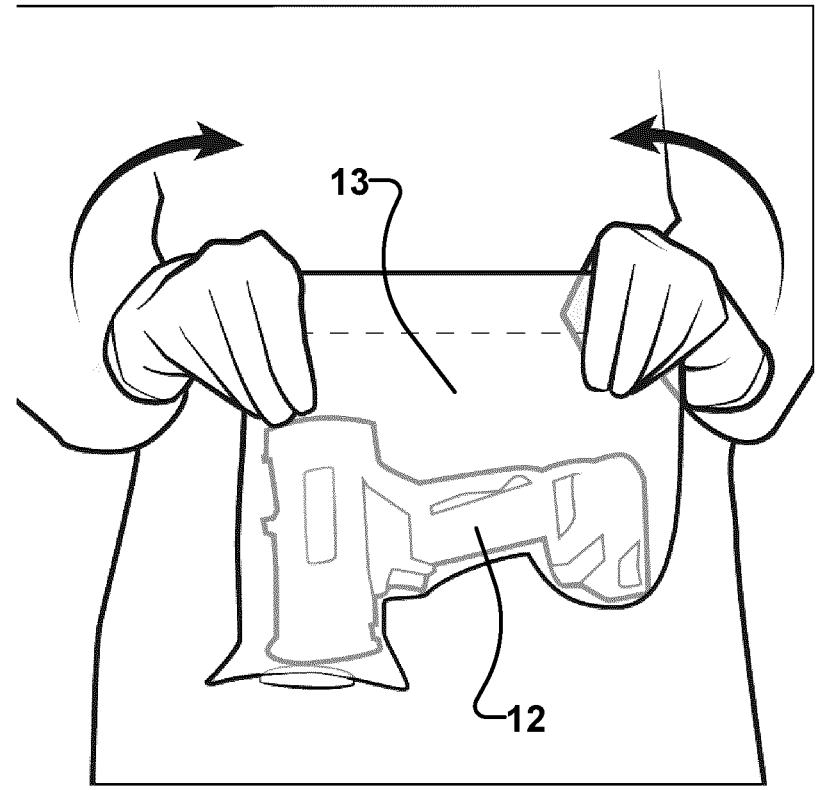
Figure 7C:
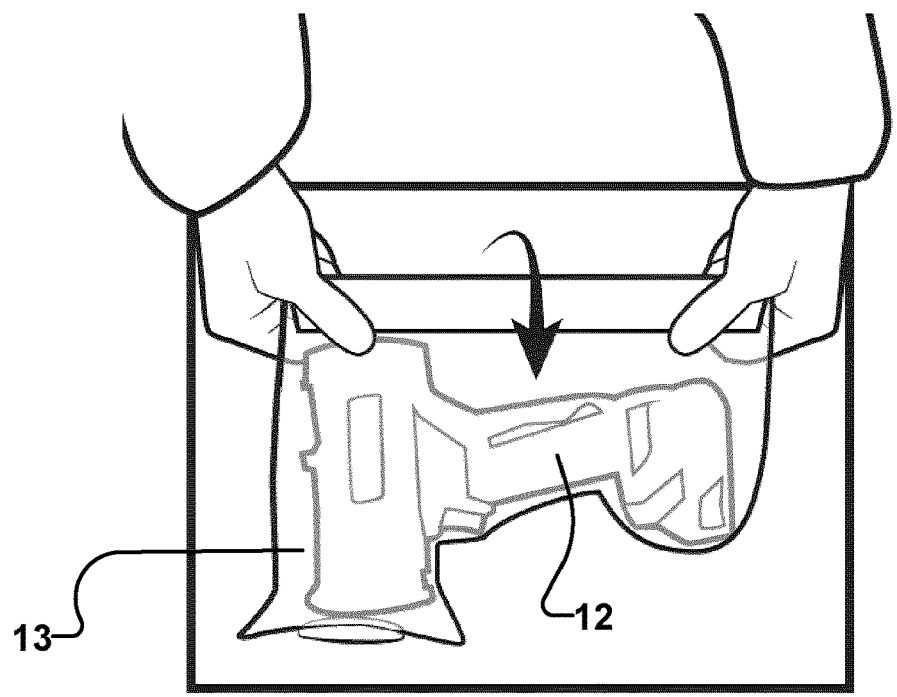

Once driver 12 is inserted into sterile cover 13, folded over edge portion 13C may be unfolded as shown by way of example in FIG. 7B, and the opening through which driver 12 was inserted into sterile cover 13 may be closed as shown by way of example in FIG. 7C.

Figure 7D:
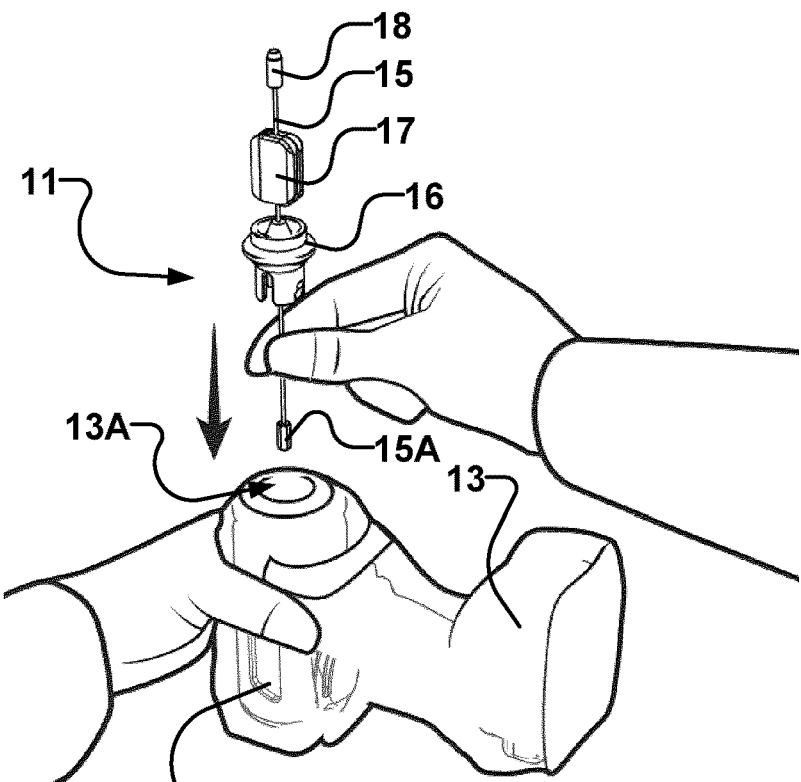
Figure 7E:
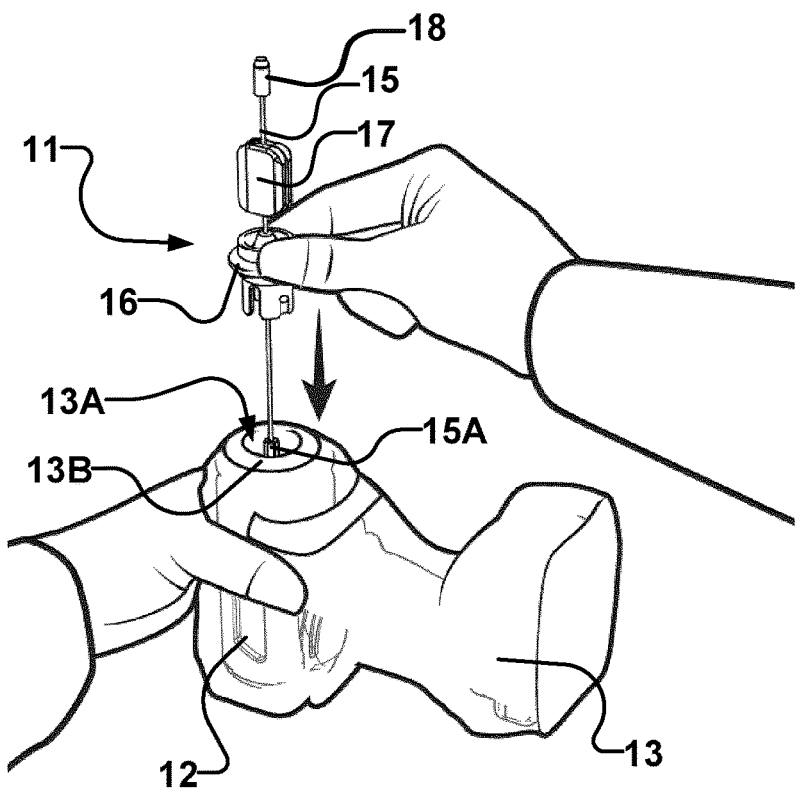
Figure 7F:
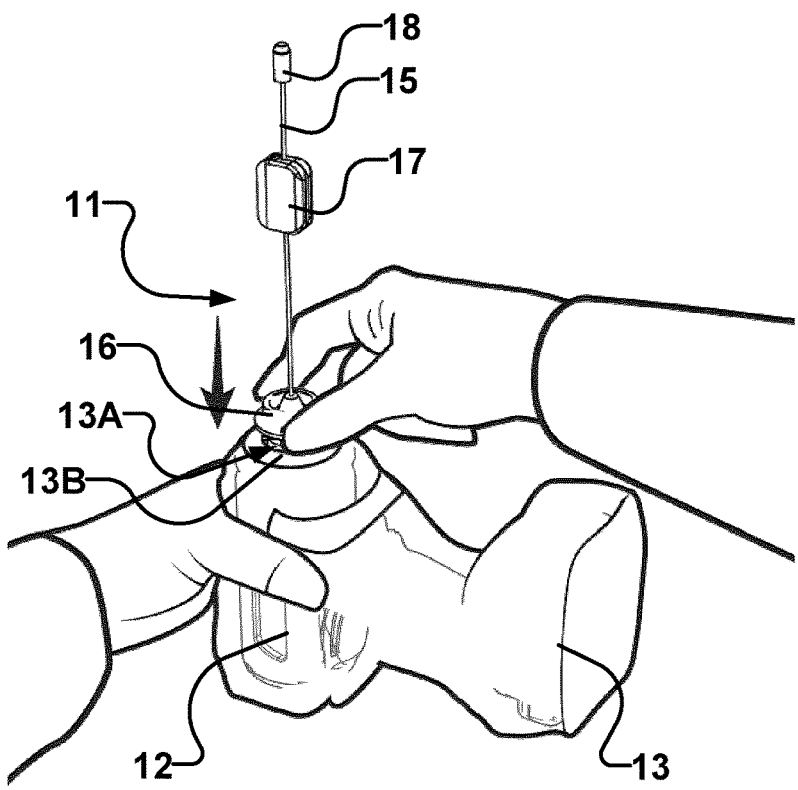
Figure 7G:
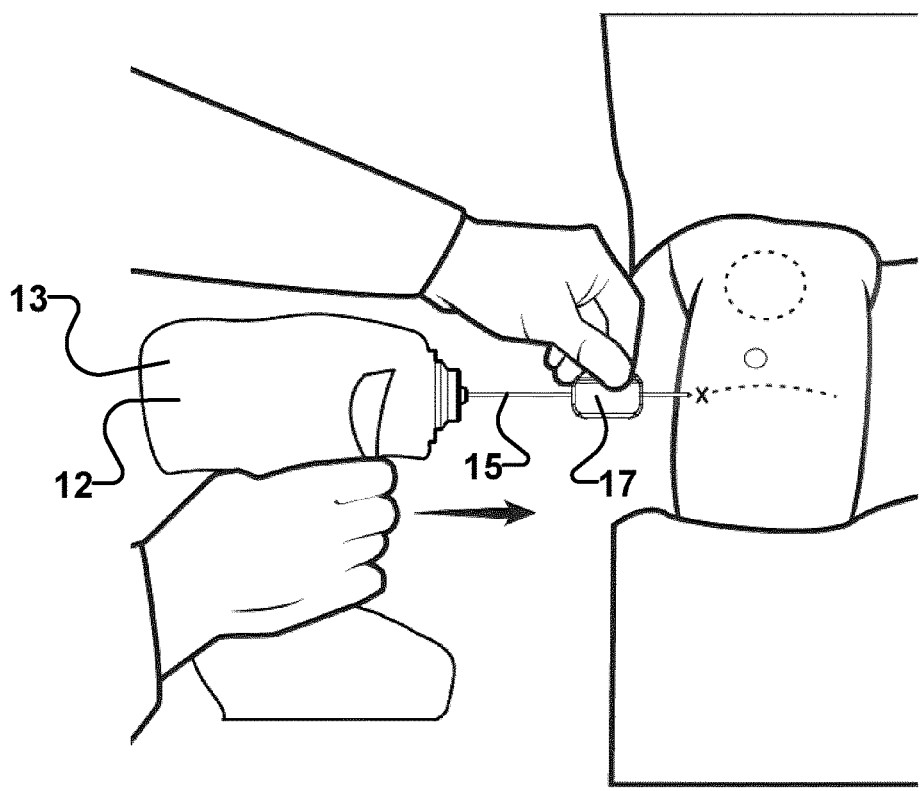
Figure 7H:
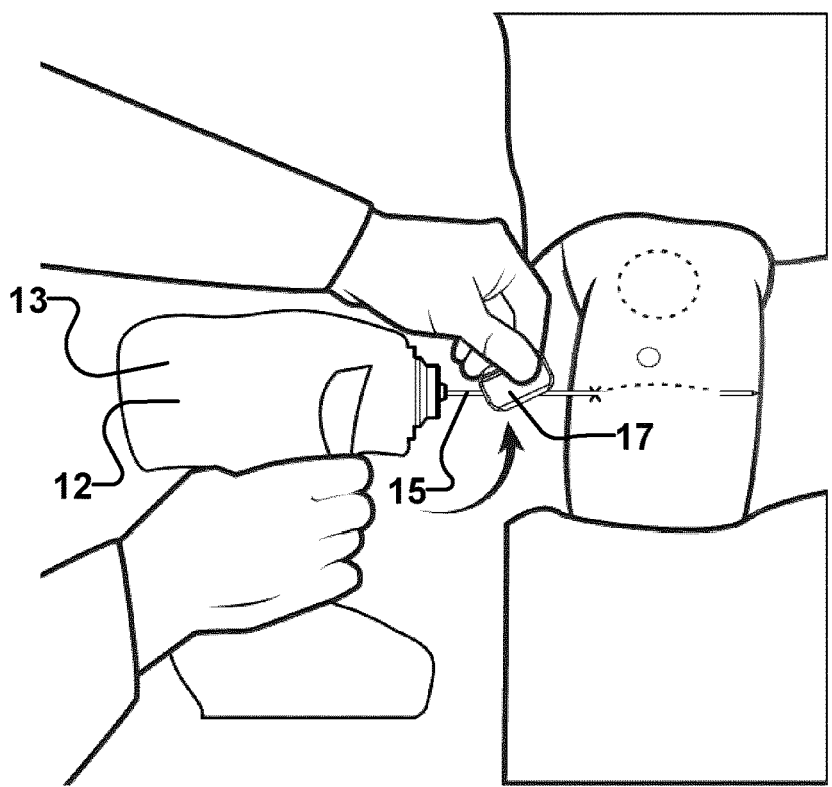

Traction pin assembly 11 may then be coupled to driver 12 as shown by way of example in FIG. 7D. Traction pin assembly 11 preferably comprises adapter 16, guide 17 and cap 18 already coupled to traction pin 15. In some cases traction pin assembly 11 is removed from a sterile packaging, for example a two-part peel-away sterile wrapping, immediately before traction pin assembly 11 is coupled to driver 12. As described elsewhere herein, pin end 15A of traction pin 15 may be inserted into a coupling mechanism of a receiving end of driver 12. Traction pin assembly 11 may be held with one hand while the other hand is used to hold driver 12. Once pin end 15A of traction pin 15 has been coupled to driver 12, adapter 16 may be moved towards driver 12 and coupled to driver 12, as shown by way of example in FIGS. 7E and 7F.

As described elsewhere herein, coupling adapter 16 to driver 12 may position adapter 16 a sufficient distance away from driver 12 to seal opening 13A of sterile cover 13. Additionally, coupling adapter 16 to driver 12 may position a surface of adapter 16, such as surface 34 shown in FIGS. 4A to 4E or surface 434 shown in FIGS. 4F and 4G, a sufficient distance away from driver 12 to at least partially compress one or more gaskets 13B which may surround opening 13A. Compressing gasket(s) 13B reduces the likelihood of gaps being present in the seal that closes opening 13A.

In some embodiments, as described elsewhere herein, pin end 15A of tracking pin 15 may comprise plural members, such as parts 15A-1 and 15A-2 as described elsewhere herein. In such cases, first part 15A-1 may be inserted into the coupling mechanism of a receiving end of driver 12 before or after driver 12 is inserted into sterile cover 13. In such cases, pin 15 may be coupled to driver 12 by moving adapter 16 towards driver 12 and coupling adapter 16 to driver 12.

Once pin 15 has been coupled to driver 12, an operator or user, examples of which are provided elsewhere herein, may proceed to insert traction pin 15 into tissue to be stabilized. As an initial step, the operator removes cap 18, if included and already installed on traction pin 15, thereby exposing tip 15C (FIG. 2, for example) of traction pin 15. As traction pin 15 is being inserted into the tissue, guide 17 may be used to stabilize and/or steer traction pin 15 as shown by way of example in in FIG. 7G. Once traction pin 15 has been inserted into the tissue by a desired amount or by an amount such that traction pin 15 no longer needs to be stabilized, guide 17 may be uncoupled or separated from traction pin 15, as shown by way of example in FIG. 7H. This may, for example, be done by pressing second portions 41B and 42B (FIGS. 5B and 5D) together to separate first portions 41A and 42A apart from one another such that guide 17 may be uncoupled or separated from traction pin 15. An operator may choose to couple guide 17 with traction pin 15, uncouple or separate guide 17 from traction pin 15, and possibly re-couple guide 17 with traction pin 15 at any point during the procedure.

Figure 7I:
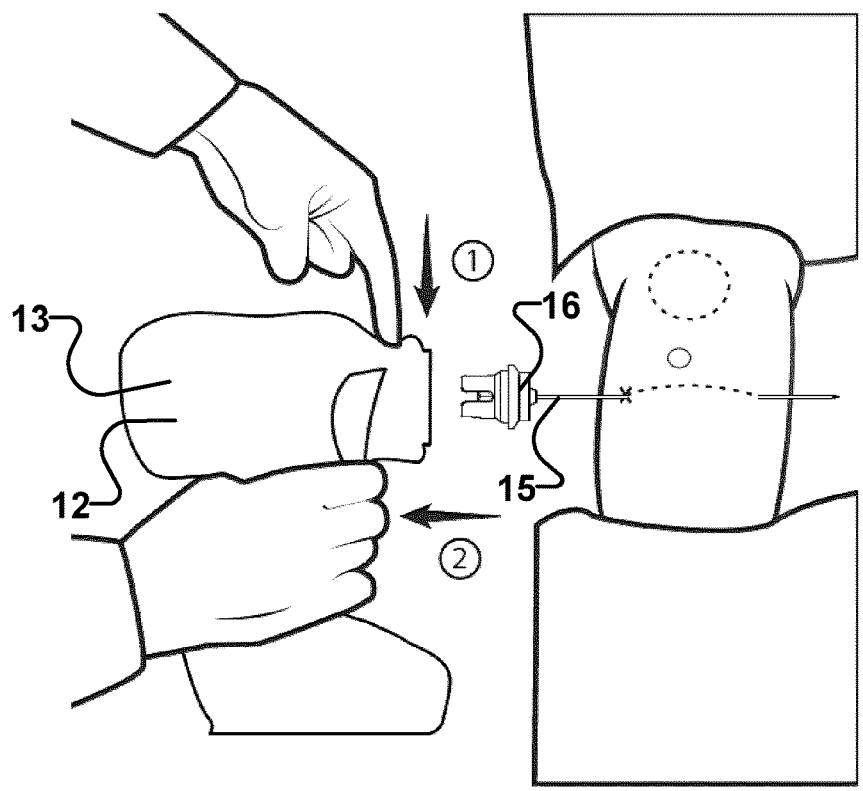

When traction pin 15 has been inserted into the tissue, adapter 16 may be uncoupled from driver 12 as shown by way of example in in FIG. 7I. For example, a release button on driver 12 may be pressed as shown at 1 to release adapter 16 from driver 12. For example, pressing the release button may release a pin of the receiving end of driver 12 from recess 33 of adapter 16 as may be most clearly apparent from FIGS. 3H and 3O. Driver 12 may then be separated, for example by being pulled or otherwise moved away, from adapter 16 as shown at 2.

Figure 7J:
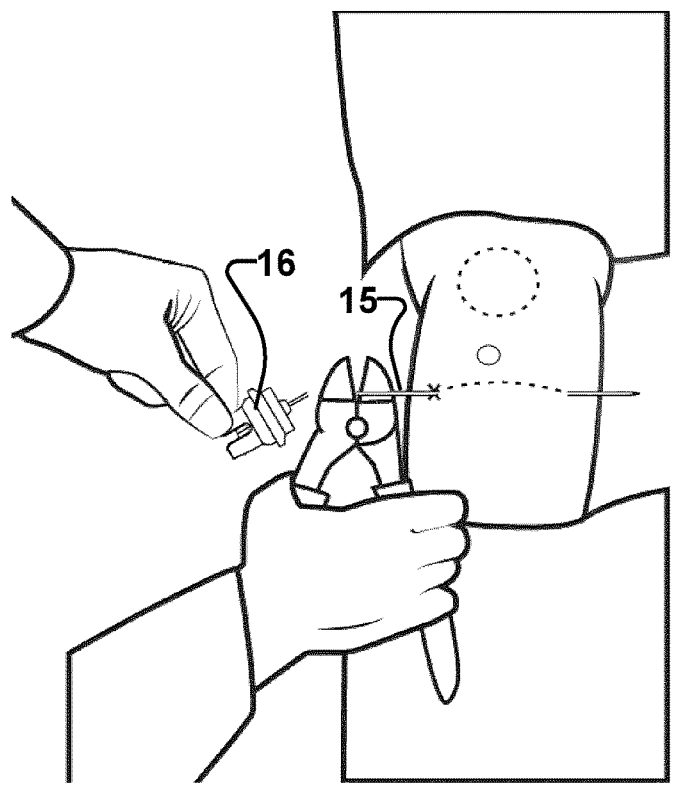
Figure 7K:
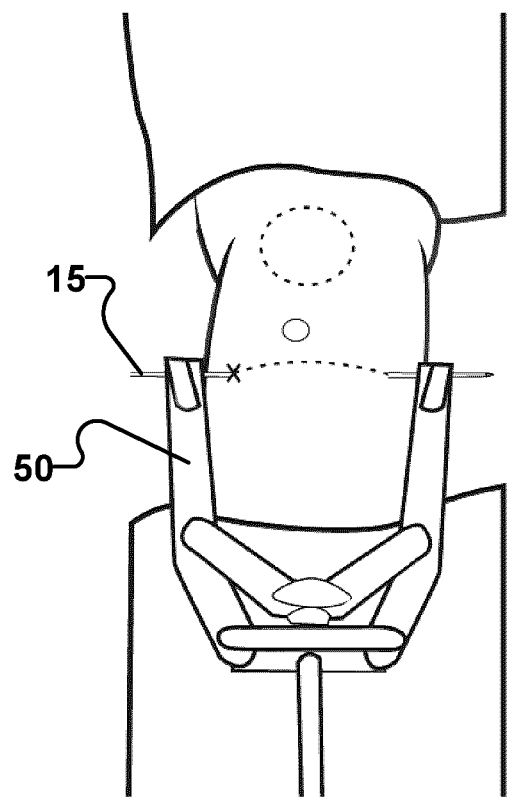

In FIG. 7J, traction pin 15 is cut to remove any excess portions of pin 15 and adapter 16. It may be desirable for traction pin 15 to extend outwardly from either side of the tissue only by an amount required to couple a traction bow to traction pin 15. In FIG. 7K, a traction bow 50 is coupled to traction pin 15.

If a sterile driver such as a sterile surgical drill is being used as driver 12, then traction pin 15 may be coupled directly to the sterile driver without first placing the driver into a sterile cover. Additionally, if a sterile driver is being used then it may be unnecessary to couple adapter 16 to the sterile driver, and a traction pin assembly may comprise only a traction pin 15, a guide 17 and optionally a cap 18. An adapter may be used even with a sterile driver, to retain a traction pin in a coupling mechanism for example.

Although the foregoing method has been described and illustrated in the context of human tissue, the apparatus and methods described herein may be used for veterinary applications as well.

Other variations are also possible. For example, in some embodiments a traction pin assembly or a system such as a kit includes a two caps. One cap may be installed or re-installed on a traction pin tip after the traction pin has been inserted, such as after the operation shown in FIG. 7I, after the operation shown in FIG. 7J, or after the operation shown in FIG. 7K, for example. The other cap may be installed over a cut end of traction pin 15 after the operation shown in FIG. 7J or after the operation shown in FIG. 7K, for example, to protect against damage or injury from a cut end of the traction pin, which may be sharp.

Driver

Figure 8A:
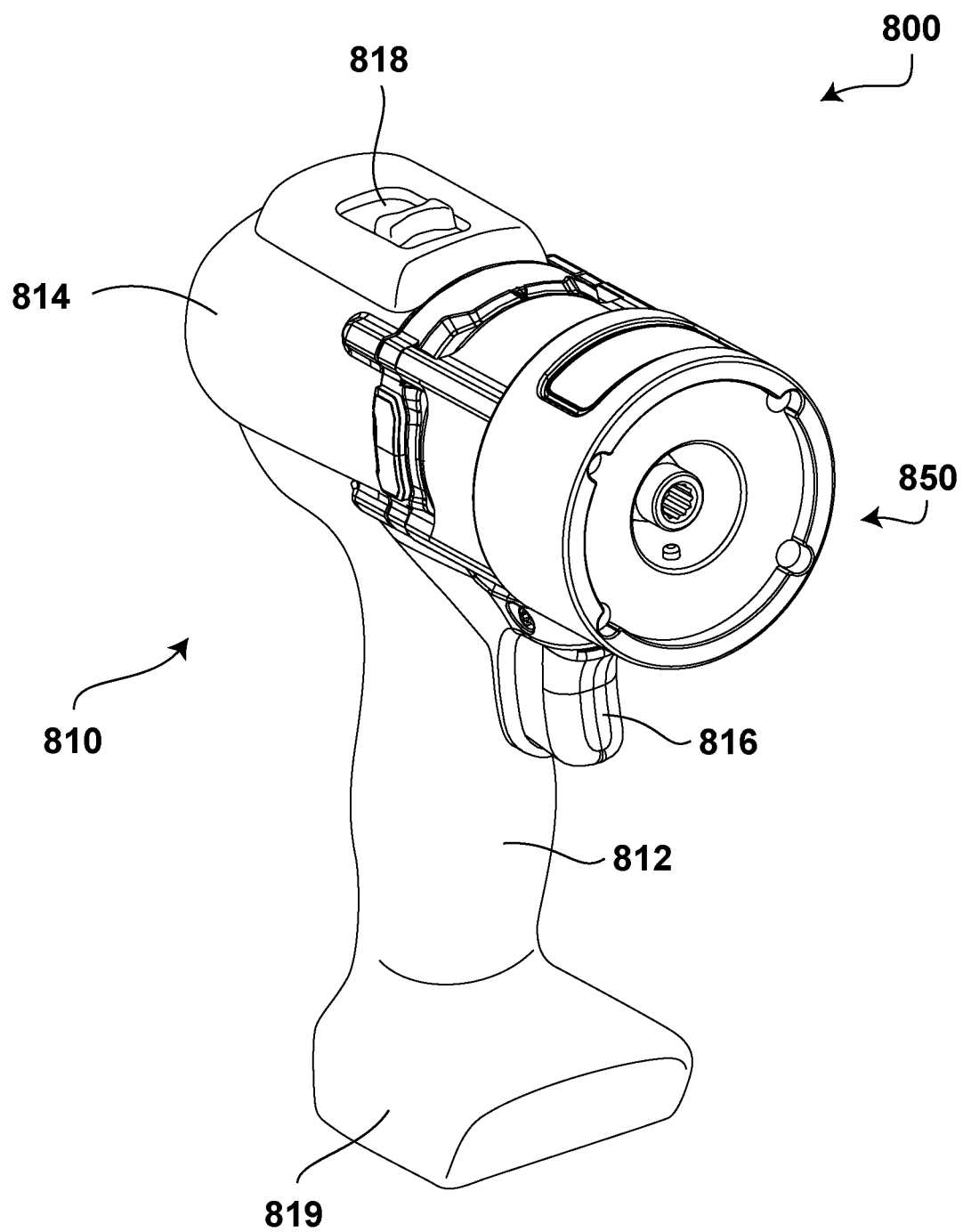
FIG. 8A is a perspective view of an example driver according to an embodiment.

FIG. 8A is a perspective view of an example driver according to an embodiment. The example driver 800 includes a power tool 810 and a receiving end 850. The power tool 810 includes a handle 812, a motor housing 814, and a power connector 819. The power connector 819 may include or be couplable to a power supply or source such as a battery in the case of a cordless base power tool or a power cord for connection to an electrical outlet in the case of a corded power tool. For application in a sterile environment, a cordless base power tool may be preferred because a cordless base power tool may be more easily sealed within a sterile cover. A power trigger or button 816 and a speed controller 818 in the form of a slider switch are illustrated as examples of control elements for operation of the base tool 810. A directional control switch to control direction of rotation is another example of a control element that may be provided in some embodiments.

The base power tool 810 may be a commercially available power tool, or part of such a power tool, and examples of such tools are provided elsewhere herein. The receiving end 850 configures or adapts a power tool for use with a traction pin or traction pin assembly.

Figure 8B:
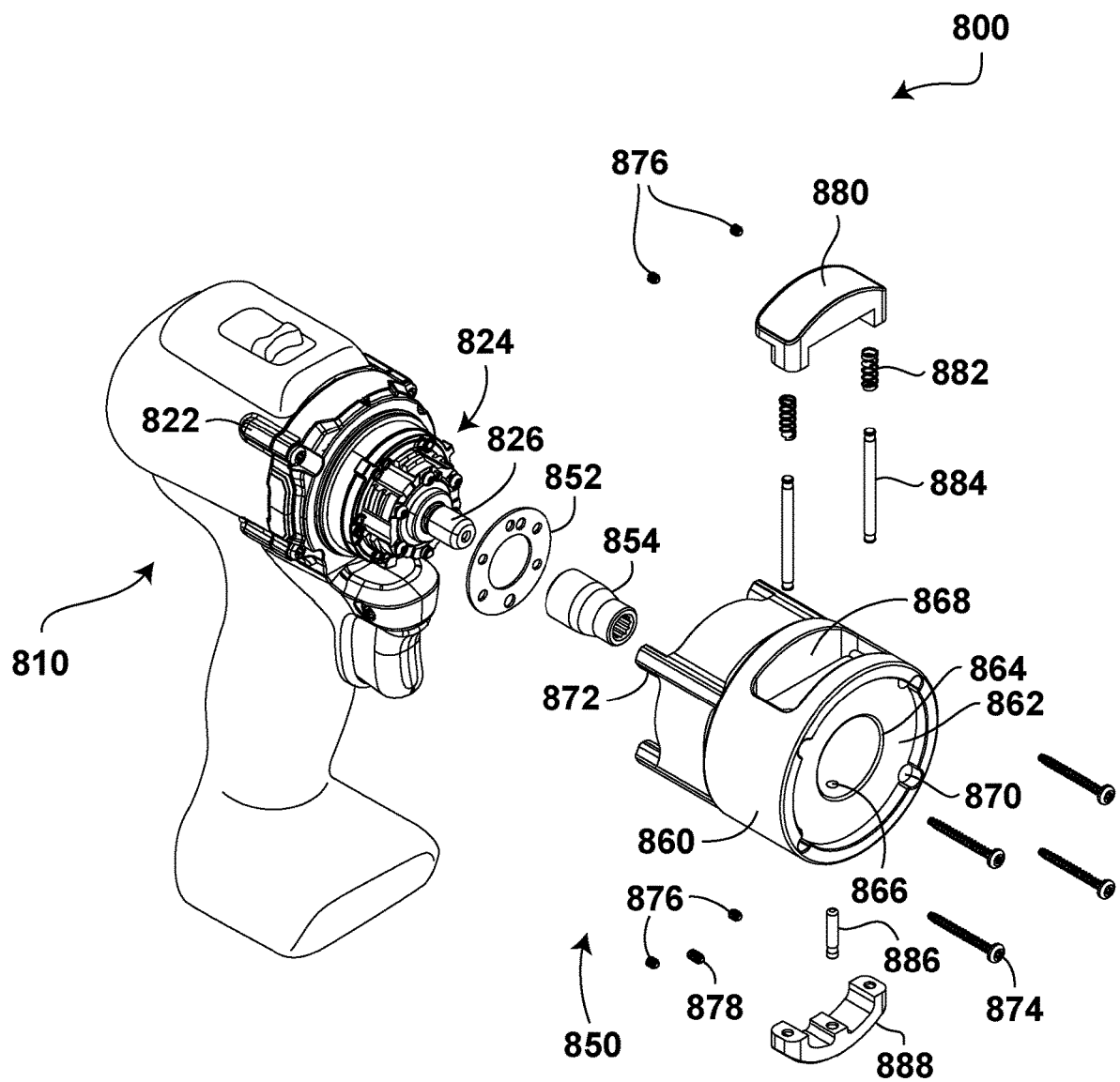
FIG. 8B is an exploded view of the example driver of FIG. 8A.

FIG. 8B is an exploded view of the example driver of FIG. 8A. As shown, the base power tool 810 may be a bare or partial tool in the sense that it need not include such parts as a clutch assembly or a chuck or collar that may normally be provided in a commercially available drill or driver. In the example shown, the motor 824 and motor shaft or rotor 826 are exposed. A commercially available power tool could be partially disassembled to replace a clutch assembly and a chuck or collar with a receiving end 850, or the base power tool 810 could be provided in a form as shown in FIG. 8B, by removing the base power tool from a production line before installation of a clutch assembly and a chuck or collar, for example.

In FIG. 8B, element 822 represents a structure such as a bore or fastener structure to receive a fastener 874 for coupling or attaching the receiving end 850 to the base power tool 810. In the example shown, there are four fasteners 874 and four structures 822, one of each of which is labeled in the drawing, but other embodiments may include more or fewer than four fasteners or structures. In an embodiment, the fasteners 874 are threaded metal screws and the structures 822 are threaded metal bores or included metal nuts to engage or receive the fasteners to couple the receiving end 850 to the base power tool 810. The structures 822 may be added to the base power tool 810 or may be provided on the base power tool for another purpose, such as attaching a clutch assembly to the base power tool to complete a commercial power tool for other purposes than for use with the receiving end 850.

Turning now to the receiving end 850, in the example shown the receiving end 850 includes a clutch washer 852, a motor shaft adapter 854, and a body or housing 860.

The clutch washer 852 is a metal washer in an embodiment, and may be positioned relative to the motor 824 by placing two of the smaller bores or apertures, which are defined between inner and outer edges of the clutch washer, over pins or protrusions on the motor 824. The clutch washer 852 is held in place in the embodiment shown by fasteners 876, 878, which are installed through others of the smaller bores or apertures and into bores or structures in the motor 824. The fasteners 876, 878 are metal set screws to be received in metal threaded bores or other structures in the motor 824 in some embodiments.

The motor shaft adapter 854 is generally cylindrical in the example shown, and may be made from or include one or more metals and/or other materials that are suitable for transferring torque from the motor shaft 826 to a traction pin. The motor shaft adapter 854 is couplable to the motor shaft 826, by a bonded connection, a threaded connection with threading on the motor shaft and the motor shaft adapter, or by another type of connection. The motor shaft adapter 854 is also referred to herein as a coupling mechanism of a driver. In the example shown, and perhaps more clearly visible in FIG. 8A, the motor shaft adapter 854 has a twelve-point internal profile, which may be generally referred to as a twelve-point hex structure with rounded faces. Such a structure may engage, at least partially, one or more surfaces and/or vertices of a traction pin end.

In some embodiments, the clutch washer 852 and the motor shaft adapter 854 are coupled to the base power tool 810, and then the housing 860 is installed over the clutch washer and the motor shaft adapter to complete assembly of the driver 800, using the fasteners 874 and installing the fasteners through axial bores 870 through the housing 860 in the example shown. Other parts of the receiving end 850 shown in FIG. 8B may be installed in or on the housing 860 before or after the housing is installed.

The housing 860 is generally cylindrical in the example shown, and may be made from or include metal(s), plastic(s), and/or other materials with sufficient strength to retain a traction pin assembly adapter as generally described by way of example elsewhere herein. The housing 860 defines an internal cavity with an aperture or opening 864 through an end wall 862 thereof, to receive one or more protrusions of an adapter, and an inner surface of the cavity defines an aperture 866 through which a locking pin 886 is extendable to retain the adapter, as shown by way of example in FIGS. 3H and 3O.

An adapter retention assembly or locking pin assembly to releasable retain an adapter includes a release button 880, coil springs 882, shafts 884, locking pin 886, and plate 888 in the example shown. In general, these components may be made from or include metal(s) and/or plastic(s), and different components may be made from different material(s). Although not visible in FIG. 8B, the release button 880 includes structures that define bores to receive shafts 884, and the shafts 884 are designed or otherwise configured to extend through bores in the housing 860. Structures in the plate 888 that define bores for receiving the shafts 884 are visible in FIG. 8B, and the plate also includes a further structure defining a bore for receiving the locking pin 886. Each shaft 884 may be couplable to the release button 880 by a bonded connection, a threaded connection with threading on the shaft and a bore defined by a structure of the release button, or by another type of connection. Each shaft 884 may also be couplable to the plate 888 by a bonded connection, a threaded connection with threading on the shaft and a bore defined by a structure of the plate, or by another type of connection. Similarly, the locking pin 886 may be couplable to the plate 888 by a bonded connection, a threaded connection with threading on the locking pin and a bore defined by a structure of the plate, or by another type of connection. Different types of connection may be used between different components.

When assembled, the coil springs 882 are positioned between opposed surfaces on the housing 860 and the release button 880, to bias the release button away from the housing, in an upward direction in the view shown in FIG. 8B. The shafts 884 are coupled to the release button 880 and the plate 888, and therefore the coil springs 882 also bias the plate 888 toward the housing 860, which in turn biases the locking pin 886 toward a retention position in which the locking pin extends through the aperture 866 to releasably retain a traction pin assembly adapter. Pushing the release button 880 compresses the coil springs 882 and moves the locking pin 886 downward in the view shown in FIG. 8B and out of a recess in an adapter so that the adapter can be removed.

The shafts 884 may extend through the coil springs 882 in an embodiment. In other embodiments, the coil springs 882 are located separately from the shafts 882. It should also be appreciated that other biasing arrangements or elements may also or instead be provided. For example, a single coil spring between opposed surfaces of the release button and the housing 860 may provide sufficient biasing. Other types of biasing elements such as one or more leaf springs may be provided in addition to or instead of coil springs. An example above refers to overcoming bias by compressing the coil springs 882, but one or more coil springs and/or other biasing elements may also or instead be used in tension, between structures of the housing and the plate 888 for example, to bias the locking pin into a retention position.

The example driver 800 is intended solely for illustrative purposes. Other arrangements may be implemented to enable a traction pin or a traction pin assembly to be used with a power tool. For example, a push-to-release locking pin assembly may be beneficial for ease of operation when a non-sterile tool is sealed within a sterile cover, but is just one possible form of a driver receiving end. Other embodiments include pull-to-release assemblies in which a collar or other structure of a receiving end is pulled to release an adapter and a tracking pin. Further embodiments of a receiving end may also be or become apparent from the present disclosure.

Drivers may include other features, in addition to or instead of those explicitly shown or described herein. Although a base power tool may include a speed controller 818 as shown in FIG. 8A, for example, it may be preferable to physically lock that controller into a specific position, so that a user need not remember to set the base power tool to high or low speed. An insert sized to fit within an aperture defined in a base power tool housing may be provided and installed to physically lock a speed control switch into a preferred position, for high speed operation for example. A direction controller may also or instead be locked into a preferred position. Although a traction pin may be installable by rotation in a clockwise or counter-clockwise direction, it may be useful to lock or otherwise configure a base power tool for only one direction of rotation so that a user need not be concerned with setting a direction of rotation and can reliably predict the direction in which a traction pin will be rotated during insertion. This might appear to be an insignificant operational detail, but having one less operator control setting can be important to reduce driver setup time in a time-critical scenario. Having a fixed rotation direction may allow an operator to know in advance what to expect, thereby potentially reducing the likelihood of operator error that might otherwise occur if a driver had not been properly set up then does not behave as the operator expected.

A driver, like other components of a traction pin system, may itself embody new and useful features.

Example Embodiments

Embodiments disclosed herein encompass traction pin assemblies, kits, systems, components, and methods. Illustrative examples are provided above, and embodiments that relate to these and other examples are also discussed below.

In some embodiments, a traction pin assembly includes a traction pin and an adapter. Other components such as a guide may also be provided. It should be noted, however, that embodiments without a guide are contemplated. Although a guide may be useful in steering or otherwise supporting a traction pin, in at least some embodiments traction pin support might not be needed, such as for larger traction pins having a diameter of 4.0 mm or more for example. Larger traction pins have more structural strength and might not require additional support during insertion.

A traction pin is insertable into bone tissue to stabilize the bone tissue, and may include a shaft extending between an end of the traction pin and a tip of the traction pin. Examples of traction pins such as 15, including a single-part or multi-part pin end such as 15A, a shaft such as 15B, and a tip such as 15C are provided elsewhere herein. The end of the traction pin is couplable to a driver that is operable to rotate the traction pin, and examples of how a pin end and a driver may be coupled to each other are also provided at least above.

The pin end of the traction pin may have a physical dimension, such as width, that is greater than a physical dimension, such as width or diameter, of the shaft of the traction pin. Various examples are shown throughout the drawings and described in detail herein.

A pin end of a traction pin is couplable to a driver that is operable to rotate the traction pin. For example, a pin end may include a first end to be received in a coupling mechanism of the driver to couple the pin end to the driver, and a second end, toward the shaft, to engage an adapter. The adapter is couplable to the driver to engage the second end of the pin end and retain the pin end in the coupling mechanism. This is perhaps most clearly shown by way of example in FIGS. 3H and 3O, in which opposite ends of a pin end are received in a coupling mechanism of a driver 12 and engaged by the adapter 16. Opposite ends 306 and 310 are also shown by way of example in FIGS. 3P and 3Q, in which 306 is an example of a first pin end to be received in a coupling mechanism of a driver and 310 is an example of a second end, toward the shaft 315B of a traction pin, to engage an adapter.

The end of a traction pin may have a cross-section that corresponds or is otherwise complementary to a cross-section of a coupling mechanism of the driver that receives the end of the traction pin or through which the end of the traction pin is otherwise couplable to the driver. The cross-section of the end of the traction pin is hexagonal in an embodiment, but other shapes are possible.

More generally, a pin end may include one or more engagement surfaces to fully or partially engage one or more engagement surfaces of the coupling mechanism. A pin end may include fewer engagement surfaces than the coupling mechanism, as in the case of a twelve-sided coupling mechanism and a hexagonal pin end as one example.

A twelve-sided coupling mechanism and a hexagonal pin end also illustrates an example of embodiments in which a pin end includes one or more vertices to engage one or more vertices of a coupling mechanism, and the pin end includes fewer vertices than the coupling mechanism.

Single-part and multi-part pin ends are disclosed. A multi-part pin end includes plural members that are couplable together to transfer torque between the plural members.

Disclosed examples of multi-part pin ends include plural members with a first part that is pre-insertable into a coupling mechanism of a driver or otherwise couplable to a driver and a second part coupled to the shaft of the traction pin. One of the first part and the second part may include a cavity and the other one of the first part and the second part may include a protrusion extending longitudinally outwards, with the protrusion being receivable within the cavity. Surfaces of the protrusion may frictionally engage surfaces of the cavity. In some embodiments, inserting the protrusion into the cavity centers the first part of the end of the traction pin relative to the second part of the end of the traction pin. More generally, the protrusion and the cavity may be configured to center the first part of the end of the traction pin relative to the second part of the end of the traction pin. As described elsewhere herein, the cavity and the protrusion may each have a length that is equal to at least 60% of a length of the first part of the end of the traction pin.

In some embodiments, the one of the first part and the second part of the pin end includes a plurality of cavities (including the cavity mentioned above) and the other one of the first part and the second parts includes a plurality of protrusions (including the protrusion mentioned above) extending longitudinally outwards. Each of the protrusions is receivable within a respective cavity of the plurality of cavities.

The other one of the first and second parts, which includes the protrusions, may also include a shoulder. The shoulder is circular in an embodiment, and a diameter of the shoulder may be smaller than a width of a coupling mechanism of the driver that receives the end of the traction pin, or into which the end of the traction pin is receivable.

These and other examples of features of a multi-part pin end are disclosed at least above with reference to FIGS. 3B to 3O.

A pin end, or a part of a multi-part pin end, may be or include a drive structure that is coupled to a retention structure at an end of the shaft opposite the tip. A retention surface or retention structure, as described by way of example elsewhere herein, may improve retention of a pin end on the shaft of a traction pin and/or improve resistance of the pin end against spinning relative to the shaft when the traction pin is being inserted into tissue using a driver.

A pin end may include a guide surface, such as the surface 304 shown by way of example in FIGS. 3P and 3Q, to guide the pin end into a coupling mechanism of a driver.

A portion of shaft of a traction pin extends, or is extendable through, an adapter that is couplable to a driver to axially retain the traction pin relative to the driver. Coupling the adapter to the driver axially retains the traction pin relative to the driver. For example, an adapter may include a structure through which a portion of a shaft of the traction pin is extendable, and the structure may include a surface to engage a pin end of a traction pin. As disclosed by way of example at least above, an adapter may also include one or more guiding protrusions, coupled to the structure, to couple the adapter to the driver and engage the surface with the pin end to retain the pin end in a coupling mechanism of the driver. Retention of a pin end by an adapter are shown perhaps most clearly in FIGS. 3H and 3O, and described above with reference to these and other drawings of adapter examples.

In some embodiments, the adapter includes or defines a hole through which a portion of the traction pin extends or is extendable. An adapter may be coupled to a traction pin or separate from a traction pin, and accordingly unless indicated otherwise, references to a traction pin or a portion thereof extending through an adapter should be interpreted as encompassing separate adapter embodiments in which a traction pin or portion thereof is extendable through an adapter. In an assembled state, an adapter may be positioned closer to the tip of a traction pin than to the end of a traction pin, but at least when a traction pin assembly is to be used and the adapter is to be coupled to a driver the adapter is closer to the end of the traction pin than to the tip of a traction pin.

A hole through which a portion of a traction pin extends or is extendable may have a physical dimension, such as diameter, is less than a physical dimension, such as a width or diameter, of the end of the traction pin. The hole of the adapter may be defined in or by a structure of the adapter that extends longitudinally. Such a structure may at least partially retain the traction pin against transverse movement, or prevent transverse movement of the traction pin, relative to the adapter. This type of structure of an adapter is also described herein as retaining or axially retaining the traction pin or pin end.

In some embodiments, the structure is conical, but other shapes are possible.

Friction between one or more surfaces of a hole of the adapter and a surface of the shaft of a traction pin may be greatest at an end of the hole that is distal from an end of the adapter that is received within or otherwise couplable to the driver.

An adapter may include or define a recess into which a locking pin of the driver may be received or is receivable to axially lock the adapter relative to the driver. For example, a guiding protrusion may define a groove into which a locking pin of the coupling mechanism is receivable to axially lock the adapter relative to the driver in any of a plurality of relative angular positions of the adapter relative to the driver, as shown by way of example in FIGS. 4F and 4G and described by way of example at least above.

An adapter may include a ramp along which a locking pin may slide or is slidable prior to being received in the recess of the adapter. In an embodiment, the ramp extends around an insertion end of the guiding protrusion that is configured for insertion into a recess of the driver to couple the adapter to the driver, and the locking pin is slidable along the ramp prior to being received in the groove. Such a ramp extending around an insertion end of a guiding protrusion is also shown by way of example in FIGS. 4F and 4G and described by way of example at least above.

Embodiments of adapters disclosed herein encompass adapters with at least one guiding protrusion that is receivable in a recess of the driver. In some embodiments, the guiding protrusion(s) may be receivable in a recess of the driver to orient the adapter relative to the driver, but this is not the case in all embodiments. For example, in some embodiments an adapter is couplable to a driver in any of a plurality of orientations or relative positions.

An adapter may carry or otherwise include one or more markings indicating an orientation of the adapter, relative to the driver, in which the adapter is couplable to the driver. Again, not all embodiments involve a particular orientation between an adapter and a driver, and therefore not all embodiments necessarily involve an adapter with such markings.

A guide, or a structure that is part of the guide, defines a passage such as 17A (FIGS. 5A to G) through which a portion of the shaft of the traction pin extends or is extendable, and in which the traction pin is rotatable. The portion of a traction pin shaft that extends through an adapter may be referred to as a first portion of the shaft, and the portion that extends through a guide passage may be referred to as a second portion of the shaft, or otherwise, to distinguish between these different portions of a traction pin shaft.

As also described elsewhere herein, a guide includes or provides a surface to enable gripping of the guide, and the surface has a larger surface area than a surface of the portion of the traction pin shaft that extends through the guide passage. This is clearly evident from FIGS. 5A to 5G and other drawings that show the guide. Any surface by which a traction pin shaft may be gripped by a user clearly has a smaller surface area than an outer surface of a guide, by which the guide may be gripped or held by a user.

A guide may be coupled to a traction pin between the adapter and the tip of the traction pin, as shown by way of example in various drawings and described by way of example at least above. A guide may be pre-installed and coupled to a traction pin in a traction pin assembly, or provided separately from a traction pin. If pre-installed, a guide may at least be separable from a traction pin in an embodiment. For example, a guide as shown in FIGS. 5A to 5E may be separated from a traction pin by moving parts of the guide apart from each other, or by sliding the guide along the traction pin and past the traction pin tip. A guide as shown in FIGS. 5F and 5G may be separated from a traction pin by sliding the guide along the traction pin and past the traction pin tip.

In some embodiments, and as disclosed by way of example with reference to FIGS. 5A to 5D, a guide includes a first half and a second half pivotably coupled together with a hinge. In such embodiments, inner surfaces of the first half and the second half of the guide may include grooves, such as grooves 41D and 42D shown by way of example in FIGS. 5B to 5D, or other features or structures defining the passage through which the shaft of the traction pin extends or is extendable.

As shown by way of example in FIG. 5C and described at least above, either or both of a first aperture 17B and a second aperture 17C that partially define the guide passage may be cordate.

In some embodiments, a guide also includes a clamp, shown by way of example at 47 in FIG. 5C, to engage a portion of the shaft of the traction pin. The embodiment in FIG. 5C is illustrative of one example of a clamp positioned along the guide passage between a first aperture and a second aperture (17B, 17C) that partially define the passage, and at least one inner surface of the clamp, which may include the inner surface of either or both of the opposed side walls 49 in the example shown, frictionally engages the shaft of the traction pin.

Apertures in the guide that partially define the passage may have a physical dimension, such as width, that is larger than a physical dimension, such as diameter, of the shaft of a traction pin. This may be useful in helping to avoid binding of the traction pin while it is being rotated. In clamp embodiments, a clamp may be positioned along the passage between the first and second apertures, aperture sizing may also or instead enable the clamp to engage a portion of the shaft of the traction pin with an engagement force that is independent of gripping force applied to the surface. This is because, with apertures larger than the traction pin shaft, the apertures do not affect the engagement force that is applied to the traction pin by the clamp. The clamp engagement force may be a fixed or substantially fixed engagement force in some embodiments.

The clamp may be positioned on the hinge between the first half and the second half of the guide. In an embodiment, the clamp includes opposed side walls extending into the passage from the hinge to engage the portion of the traction pin. Side walls are shown by way of example at 49 in FIG. 5C. The side walls of a clamp may extend from a surface of the hinge or from the base 48, for example.

A hinge may separate a guide into a first portion of the guide on one side of the hinge, as shown by way of example at 41A and 42A in FIGS. 5B to 5D, and a second portion of the guide on an opposing side of the hinge, as shown by way of example at 41B and 42B in FIGS. 5B to 5D. In such embodiments, inner surfaces of a first half (for example the part of half 41 above the hinge 43 in Figures to 5D) and a second half (for example the part of half 42 above the hinge 43 in FIGS. 5B to 5D) of the first portion of the guide define the passage through which the shaft of the traction pin extends or is extendable.

A first half (for example the part of half 41 below the hinge 43 in Figures to 5D) and a second half (for example the part of half 42 below the hinge 43 in FIGS. 5B to 5D) of the second portion of the guide may be coupled to the hinge such that movement of the first half and the second half of the second portion of the guide in a first direction (toward or away from each other) pivots the first and second halves of the first portion of the guide in a second direction (away from or toward each other, respectively) opposite the first direction.

A hinge may include other features, such as the tabs 45. More generally, each of the first half and the second half of the second portion of the guide (for example the parts of 41 and 42 below the hinge 43 in FIGS. 5B to 5D) may include at least one tab to limit an amount by which the first half and the second half of the second portion of the guide can pivot towards each other.

A hinge may in some embodiments separate a guide into first and second portions on opposing sides of the hinge. Other embodiments are also possible, with a hinge being located on or at an outside edge of a guide between a first half and a second half of the guide, as shown by way of example in FIG. 5E. positions or locations of a hinge.

In some embodiments at least one edge of one or both of the first half and the second half of the guide may be or include a beveled edge. In other words, one or both of the first half and the second half of the guide may include a beveled edge. This is shown by way of example at 46 in FIGS. 5A to 5D.

Guides with a hinge are not the only types of guides that may be useful in steering or otherwise supporting a traction pin. FIGS. 5F and 5G show examples of guides that have a solid geometric volume. The geometric volume is cylindrical in FIG. 5F and barrel-shaped in FIG. 5G.

In the various example guides shown in the drawings and described above, the passage extends along a longitudinal axis of the guide.

Although a guide permits rotation of a traction pin, one or more surfaces of the guide that define of the passage may engage one or more surfaces of the shaft of the traction pin to at least partially axially retain the guide relative to the pin. For example, friction between one or more surfaces of the guide and a corresponding more surface of the shaft of the traction pin may at least partially retain the guide axially relative to the pin.

Friction between surfaces of the passage of the guide and a corresponding surface of the shaft of the traction pin may be non-uniform along the passage. For example, one or more surfaces of the guide that define the passage may engage one or more surfaces of the shaft of the traction pin to provide such non-uniform friction between the guide and the traction pin along the passage. In an embodiment, friction is non-uniform in that friction along middle portions of the passage is greater than friction along end portions of the passage.

A cap that is coupled to, or couplable to, a traction pin to cover the tip of the traction pin, may be provided in some embodiments. Such a cap may have a blunt end, as shown by way of example at 18B in FIGS. 6A to 6C.

A cap for a traction pin may be provided with a traction pin but need not necessarily be installed on the traction pin. Whether or not installed on a traction pin, a cap may include a cap body defining a cavity to receive a tip of the traction pin, and a cap end to limit insertion of the traction pin into the cavity. The blunt end 18B in FIGS. 6A to 6C, for example, is an example of a cap end that limits insertion of a traction pin into a cavity 18A of a cap body.

Either or both of a cap body and a cap end may define an air channel to enable fluid communication between the cavity and an exterior of the cap during insertion of the traction pin into the cavity or removal of the traction pin from the cavity. FIG. 6B shows an example of an air channel 624 through the cap end 18B, and as described at least above an air channel may also or instead be provided elsewhere in a cap. As another example, a cap body may include a structure on an inner surface of the cavity to engage the traction pin and define the air channel between the inner surface and the traction pin.

As shown by way of example at 624 and 626 in FIG. 6C, an outer surface of a cap body may include a surface structure, or multiple structures, to improve grip and enable twisting or turning of the cap during the insertion of the traction pin into the cavity or the removal of the traction pin from the cavity.

A traction pin, an adapter, a guide, and one or more caps are illustrative of components that may be provided in any of various combinations together in an at least partially assembled traction pin assembly or kit, or separately. Providing multiple components together and at least partially assembled may provide certain advantages in terms of ease of use, at least in that a user may be able to more quickly remove an assembled collection of components with one hand and quickly attach them to a driver in order to save time in inserting a traction pin to stabilize a patient. In an embodiment, a traction pin is packaged with at least an adapter coupled to the pin. A guide may also be coupled to the traction pin in some embodiments. A cap may be coupled to the pin end, removed before traction pin insertion, and re-installed after insertion in some embodiments.

A traction pin assembly may be packaged with other components or parts as well, such as a detached second cap for installation after a traction pin has been inserted and cut as shown in FIG. 7I, for example. Another component that may be packaged with a traction pin assembly or one or more components thereof, in the same sterile packaging or separate sterile packaging, is a sterile cover to hold a driver.

For example, a system may include a traction pin assembly and a driver, and the traction pin assembly may be coupled to the driver in some system embodiments.

Such a system may also include a sterile cover covering the driver. The driver may be placed within an inner cavity of the sterile cover, for example. The traction pin assembly in such an embodiment may be coupled to the driver through an opening in the sterile cover.

The adapter of a traction pin assembly may be coupled to the driver to position the adapter a sufficient distance away from the driver to seal the opening of the sterile cover, as described in further detail elsewhere herein. The sterile cover may include at least one gasket surrounding the opening of the cover, and the adapter may at least partially compress the gasket(s). For example, such compression may be achieved and maintained by coupling the adapter to the driver.

It may also be useful for a user to have other items readily at hand when a traction pin is to be inserted, and such items may be included in a traction pin kit. Examples of such items are provided below, and any one or more may be included with a traction pin assembly or one or more components thereof:

one or more syringes, such as a 20 cc syringe;
one or more needles, such as an 18 gauge×1.5 safety needle and/or a 22 gauge×1.5 safety needle;
traction rope or cable (nonsterile);
skin marking pen;
one or more scalpels and/or or blades, such as a safety scalpel 11 blade;
roll of sterile woven gauze;
one or more patient supports or materials to use for patient support, such as a knee positioner, towels, foam for knee bump;
sterile towels;
one or more pads of gauze impregnated with petrolatum pads;
one or more absorbent pads or dressings such as gauze pads;
sterile reprocessing wrap;
one or more drapes with adhesive, also referred to as sticky drapes;
one or more tools, such as 7¼" tube occluding forceps as an example;
one or more medications such as an anesthetic, with a Lidocaine 1% vial as one example;
sterile gloves;
patient preoperative skin preparation, optionally with an applicator.

This list is purely illustrative of other materials or supplies that it may be useful to package or otherwise include with a traction pin assembly or component, in order to place a more complete set of materials or supplies at ready disposal of a user.

A base kit may include a traction pin, an adapter, and, optionally, a guide. This type of base kit gathers together several components that may be needed or at least useful for traction pin insertion and increase efficiency. Other components such as one or more caps and/or a sterile cover may be included in a kit. Other items such as any of those referenced herein may also or instead be provided in a kit.

Methods related to traction pin assemblies and components disclosed herein may relate to methods of use, and involve such operations as inserting a traction pin into tissue using a disclosed system with a traction pin assembly and a driver, and while the traction pin is being inserted, stabilizing or steering the traction pin by holding onto the guide of the traction pin assembly.

Other methods may relate to manufacturing one or more of the disclosed components.

Still other methods may relate to assembling components together, as illustrated by way of example in FIGS. 7A to 7C and/or 7D to 7F.

Other embodiments contemplate use of a traction pin assembly in traction pin insertion, or use of a system including a traction pin assembly and a driver in traction pin insertion.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms;

"corresponding" is not limited only to fully matching features or elements.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and accompanying claims, depend on the specific orientation of the apparatus described and illustrated. The subject matter described herein may assume various alternative orientations. Accordingly, these directional terms are not strictly defined and should not be interpreted narrowly.

For example, while processes or blocks such as operations involved in a method are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component, such as a traction pin, an adapter, a guide, a driver, and so on, is referred to above, unless otherwise indicated, reference to that component, including a reference to a "means", should be interpreted as including as equivalents of that component any component which performs the function of the described component and in that sense is functionally equivalent, including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B, unless the description states otherwise or features A and B are fundamentally incompatible.

Disclosed embodiments are thus intended to be illustrative examples. Variations from the shapes, sizes, materials, and/or other features shown in the drawings or referenced are possible. As one example, although generally cylindrical adapters and generally rectangular guides are shown in the drawings, an adapter and/or a guide may have other shapes in other embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A traction pin assembly, the traction pin assembly comprising:
    a traction pin insertable into bone tissue to stabilize the bone tissue, the traction pin including a shaft that extends between an end of the traction pin and a tip of the traction pin, the end of the traction pin couplable to a driver operable to rotate the traction pin and the tip of the traction pin having a diamond shape;
    an adapter through which a first portion of the shaft of the traction pin extends, the adapter slidably disposed on the shaft of the traction pin between the tip of the traction pin and the end of the traction pin, and the adapter couplable to the driver to axially retain the traction pin relative to the driver; and
    a guide coupled to the traction pin between the adapter and the tip of the traction pin, the guide defining a passage through which a second portion of the shaft of the traction pin extends and comprising a surface to enable gripping of the guide, the surface having a larger surface area than a surface of the second portion of the shaft, the guide removably coupled to the traction pin while the adapter remains coupled to the traction pin and the driver.

2. The traction pin assembly of claim 1, wherein the guide comprises a first half and a second half pivotably coupled together with a hinge.

3. The traction pin assembly of claim 2, wherein the hinge separates the guide into a first portion of the guide on one side of the hinge and a second portion of the guide on an opposing side of the hinge.

4. The traction pin assembly of claim 3, wherein:
a first section of the first half of the guide and a first section of the second half of the guide form the first portion of the guide;
a second section of the first half of the guide and a second section of the second half of the guide form the second portion of the guide; and
the second section of the first half and the second section of the second half of the guide are coupled to the hinge such that movement of the second section of the first half and the second section of the second half in a first direction pivots the first section of the first half and the first section of the second half in a second direction opposite the first direction.

5. The traction pin assembly of claim 3, wherein at least a portion of each of the first half and the second half of the guide comprises at least one tab to limit an amount by which the first half and the second half of the guide can pivot towards each other.

6. The traction pin assembly of claim 1, wherein one or more surfaces of the guide that define the passage engage one or more surfaces of the shaft of the traction pin to at least partially axially retain the guide relative to the traction pin.

7. The traction pin assembly of claim 1, wherein the end of the traction pin has a width that is greater than a width of the shaft of the traction pin.

8. The traction pin assembly of claim 1, wherein the adapter defines a recess into which a locking pin of the driver is receivable to axially lock the adapter relative to the driver.

9. The traction pin assembly of claim 8, wherein the recess extends circumferentially around the adapter and is configured to lock the adapter with the driver in any rotational orientation relative to the driver.

10. The traction pin assembly of claim 1, further comprising a cap coupled to the traction pin to cover the tip of the traction pin.

11. The traction pin assembly of claim 10, wherein the cap includes a blunt end.

12. The traction pin assembly of claim 1, comprising:
a cap coupled to the traction pin to cover the tip of the traction pin; and
the traction pin assembly packaged in a pre-assembled state with the adapter, the guide, and the cap coupled with the traction pin.

13. A method, comprising:
providing an apparatus, including:
a traction pin insertable into bone tissue to stabilize the bone tissue, the traction pin including a shaft that extends between an end of the traction pin and a tip of the traction pin, the end of the traction pin couplable to a driver operable to rotate the traction pin; and
an adapter through which a first portion of the shaft of the traction pin extends, the adapter slidably disposed on the shaft of the traction pin between the tip of the traction pin and the end of the traction pin, and the adapter couplable to the driver to axially retain the traction pin relative to the driver;
coupling a guide to the traction pin between the adapter and the tip of the traction pin, wherein the guide comprises a first half and a second half pivotably coupled together with a hinge, wherein the hinge separates the guide into a first portion of the guide on one side of the hinge and a second portion of the guide on an opposing side of the hinge, and wherein at least a portion of each of the first half and the second half of the guide comprises at least one tab to limit an amount by which the first half and the second half of the guide can pivot towards each other: and
inserting the traction pin into tissue.

14. The method of claim 13, comprising:
coupling a cap with the traction pin to cover the tip of the traction pin.

* * * * *